United States Patent
Mueller et al.

(10) Patent No.: US 7,462,997 B2
(45) Date of Patent: Dec. 9, 2008

(54) MULTICOLORED LED LIGHTING METHOD AND APPARATUS

(75) Inventors: George G. Mueller, Boston, MA (US); Ihor A. Lys, Milton, MA (US)

(73) Assignee: Philips Solid-State Lighting Solutions, Inc., Burlington, MA (US)

( * ) Notice: Subject to any disclaimer, the term of this patent is extended or adjusted under 35 U.S.C. 154(b) by 0 days.

(21) Appl. No.: 11/775,551

(22) Filed: Jul. 10, 2007

(65) Prior Publication Data

US 2008/0012506 A1 Jan. 17, 2008

Related U.S. Application Data

(63) Continuation of application No. 10/810,481, filed on Mar. 26, 2004, now Pat. No. 7,174,160, which is a continuation of application No. 09/971,367, filed on Oct. 4, 2001, now Pat. No. 6,788,011, which is a continuation of application No. 09/669,121, filed on Sep. 25, 2000, now Pat. No. 6,806,659, which is a continuation of application No. 09/425,770, filed on Oct. 22, 1999, now Pat. No. 6,150,774, which is a continuation of application No. 08/920,156, filed on Aug. 26, 1997, now Pat. No. 6,016,038.

(51) Int. Cl.
*H05B 37/00* (2006.01)
(52) U.S. Cl. .................. 315/312; 315/294; 315/292; 315/316; 315/362; 362/231; 362/234; 362/236; 345/589
(58) Field of Classification Search ............... 315/312, 315/313, 315–318, 292, 294, 297, 360, 362, 315/149, 158, 159; 345/589; 359/276–278, 359/289; 362/800, 240, 249, 234, 236, 231

See application file for complete search history.

(56) References Cited

U.S. PATENT DOCUMENTS 1,324,008 A    12/1919    D'Humy (Continued)

FOREIGN PATENT DOCUMENTS

AU    6 267 9    12/1996

(Continued)

OTHER PUBLICATIONS

About DMX-512 Lighting Protocol—*Pangolin Laser Systems*, pp. 14, Apr. 7, 2003.

(Continued)

*Primary Examiner*—Haissa Philogene
(74) *Attorney, Agent, or Firm*—Wolf, Greenfield & Sacks, P.C.

(57) ABSTRACT

Apparatus and systems including one or more first LEDs, each first LED configured to generate first radiation having a first spectrum, and one or more second LEDs, each second LED configured to generate second radiation having a second spectrum different than the first spectrum. A diffuser is employed to blend the first radiation and the second radiation, when generated, so as to provide a uniform color of light having a visible spectrum based on a combination of the first spectrum and the second spectrum. One or more controllers are configured to control the first LED(s) and the second LED(s) such that visible light provided by the diffuser is perceived as one or more colors. In different aspects, the apparatus/systems may be configured to generate white light and/or multicolor light, may be formed to resemble conventional light bulbs, and may be arranged as a linear chain of nodes.

10 Claims, 9 Drawing Sheets

U.S. PATENT DOCUMENTS

| | | |
|---|---|---|
| 1,603,055 A | 10/1926 | Williams |
| 2,591,650 A | 4/1952 | Williams |
| 2,642,553 A | 6/1953 | Williams |
| 2,644,912 A | 7/1953 | Williams |
| 2,651,743 A | 9/1953 | Williams |
| 2,657,338 A | 10/1953 | Williams |
| 2,673,923 A | 3/1954 | Williams |
| 2,686,866 A | 8/1954 | Williams |
| 2,725,461 A | 11/1955 | Amour |
| 2,909,097 A | 10/1959 | Alden et al. |
| 3,037,110 A | 5/1962 | Williams |
| 3,111,057 A | 11/1963 | Cramer |
| 3,163,077 A | 12/1964 | Shank |
| 3,201,576 A | 8/1965 | Scott |
| 3,205,755 A | 9/1965 | Sklar |
| 3,215,022 A | 11/1965 | Oro |
| 3,240,099 A | 3/1966 | Irons |
| 3,241,419 A | 3/1966 | Grace |
| 3,307,443 A | 3/1967 | Shallenberger |
| 3,318,185 A | 5/1967 | Kott |
| 3,540,343 A | 11/1970 | Rifkin |
| 3,550,497 A | 12/1970 | Marsh |
| 3,561,719 A | 2/1971 | Grindle |
| 3,586,936 A | 6/1971 | McLeroy |
| 3,595,991 A | 7/1971 | Diller |
| 3,601,621 A | 8/1971 | Ritchie |
| 3,643,088 A | 2/1972 | Osteen et al. |
| 3,644,785 A | 2/1972 | Jarmar |
| 3,696,263 A | 10/1972 | Wacher |
| 3,706,914 A | 12/1972 | Van Buren |
| 3,740,570 A | 6/1973 | Kaelin et al. |
| 3,746,918 A | 7/1973 | Drucker et al. |
| 3,760,174 A | 9/1973 | Boennin et al. |
| 3,787,752 A | 1/1974 | Delay |
| 3,818,216 A | 6/1974 | Larraburu |
| 3,832,503 A | 8/1974 | Crane |
| 3,845,468 A | 10/1974 | Smith |
| 3,858,086 A | 12/1974 | Anderson et al. |
| 3,875,456 A | 4/1975 | Kano et al. |
| 3,909,670 A | 9/1975 | Wakamatsu et al. |
| 3,924,120 A | 12/1975 | Cox, III |
| 3,942,065 A | 3/1976 | Russ |
| 3,958,885 A | 5/1976 | Stockinger et al. |
| 3,974,637 A | 8/1976 | Bergey et al. |
| 4,001,571 A | 1/1977 | Martin |
| 4,045,664 A | 8/1977 | Vrenken et al. |
| 4,054,814 A | 10/1977 | Fegley et al. |
| 4,070,568 A | 1/1978 | Gala |
| 4,074,318 A | 2/1978 | Kapes, Jr. |
| 4,074,319 A | 2/1978 | Goldschmidt et al. |
| 4,082,395 A | 4/1978 | Donato et al. |
| 4,095,139 A | 6/1978 | Symonds et al. |
| 4,096,349 A | 6/1978 | Donato |
| 4,151,547 A | 4/1979 | Rhoades et al. |
| 4,176,581 A | 12/1979 | Stuyvenberg |
| 4,241,295 A | 12/1980 | Williams, Jr. |
| 4,267,559 A | 5/1981 | Johnson et al. |
| 4,271,408 A | 6/1981 | Teshima et al. |
| 4,272,689 A | 6/1981 | Crosby et al. |
| 4,273,999 A | 6/1981 | Pierpoint |
| 4,298,869 A | 11/1981 | Okuno |
| 4,317,071 A | 2/1982 | Murad |
| 4,329,625 A | 5/1982 | Nishizawa et al. |
| 4,339,788 A | 7/1982 | White et al. |
| 4,342,906 A | 8/1982 | Hyatt |
| 4,342,947 A | 8/1982 | Bloyd |
| 4,367,464 A | 1/1983 | Kurahashi et al. |
| 4,388,567 A | 6/1983 | Yamazaki et al. |
| 4,388,589 A | 6/1983 | Molldrem, Jr. |
| 4,392,187 A | 7/1983 | Bornhorst |
| 4,394,600 A | 7/1983 | Flannagan |
| 4,420,711 A | 12/1983 | Takahashi et al. |
| 4,455,562 A | 6/1984 | Dolan et al. |
| 4,470,044 A | 9/1984 | Bell |
| 4,500,796 A | 2/1985 | Quin |
| 4,597,033 A | 6/1986 | Meggs et al. |
| 4,622,881 A | 11/1986 | Rand |
| 4,625,152 A | 11/1986 | Nakai |
| 4,635,052 A | 1/1987 | Aoike et al. |
| 4,641,227 A | 2/1987 | Kusuhara |
| 4,647,217 A | 3/1987 | Havel |
| 4,654,629 A | 3/1987 | Bezos et al. |
| 4,654,754 A | 3/1987 | Daszkowski |
| 4,656,398 A | 4/1987 | Michael et al. |
| 4,668,895 A | 5/1987 | Schneiter |
| 4,675,575 A | 6/1987 | Smith et al. |
| 4,677,533 A | 6/1987 | McDermott et al. |
| 4,682,079 A | 7/1987 | Sanders et al. |
| 4,686,425 A | 8/1987 | Havel |
| 4,687,340 A | 8/1987 | Havel |
| 4,688,154 A | 8/1987 | Nilssen |
| 4,688,869 A | 8/1987 | Kelly |
| 4,695,769 A | 9/1987 | Schweickardt |
| 4,701,669 A | 10/1987 | Head et al. |
| 4,705,406 A | 11/1987 | Havel |
| 4,707,141 A | 11/1987 | Havel |
| 4,727,289 A | 2/1988 | Uchida |
| 4,729,076 A | 3/1988 | Masami et al. |
| 4,740,882 A | 4/1988 | Miller |
| 4,753,148 A | 6/1988 | Johnson |
| 4,768,086 A | 8/1988 | Paist |
| 4,771,274 A | 9/1988 | Havel |
| 4,780,621 A | 10/1988 | Bartleucci et al. |
| 4,794,383 A | 12/1988 | Havel |
| 4,818,072 A | 4/1989 | Mohebban |
| 4,824,269 A | 4/1989 | Havel |
| 4,833,542 A | 5/1989 | Hara et al. |
| 4,837,565 A | 6/1989 | White |
| 4,843,627 A | 6/1989 | Stebbins |
| 4,845,481 A | 7/1989 | Havel |
| 4,845,745 A | 7/1989 | Havel |
| 4,857,801 A | 8/1989 | Farrell |
| 4,863,223 A | 9/1989 | Weissenbach et al. |
| 4,870,325 A | 9/1989 | Kazar |
| 4,874,320 A | 10/1989 | Freed et al. |
| 4,887,074 A | 12/1989 | Simon et al. |
| 4,922,154 A | 5/1990 | Cacoub |
| 4,929,866 A | 5/1990 | Murata et al. |
| 4,934,852 A | 6/1990 | Havel |
| 4,935,665 A | 6/1990 | Murata |
| 4,947,291 A | 8/1990 | McDermott |
| 4,957,291 A | 9/1990 | Miffitt et al. |
| 4,962,687 A | 10/1990 | Belliveau et al. |
| 4,963,798 A | 10/1990 | McDermott |
| 4,965,561 A | 10/1990 | Havel |
| 4,973,835 A | 11/1990 | Kurosu et al. |
| 4,974,119 A | 11/1990 | Martin |
| 4,979,081 A | 12/1990 | Leach et al. |
| 4,980,806 A | 12/1990 | Taylor et al. |
| 4,992,704 A | 2/1991 | Stinson |
| 5,003,227 A | 3/1991 | Nilssen |
| 5,008,595 A | 4/1991 | Kazar |
| 5,008,788 A | 4/1991 | Palinkas |
| 5,010,459 A | 4/1991 | Taylor et al. |
| 5,027,262 A | 6/1991 | Freed |
| 5,034,807 A | 7/1991 | Von Kohorn |
| 5,036,248 A | 7/1991 | McEwan et al. |
| 5,038,255 A | 8/1991 | Nishihashi et al. |
| 5,060,118 A | 10/1991 | Penrod |
| 5,072,216 A | 12/1991 | Grange |
| 5,078,039 A | 1/1992 | Tulle et al. |
| 5,083,063 A | 1/1992 | Brooks |
| 5,089,748 A | 2/1992 | Ihms |
| 5,122,733 A | 6/1992 | Havel |

| | | | | | |
|---|---|---|---|---|---|
| 5,126,634 A | 6/1992 | Johnson | 5,544,037 A | 8/1996 | Luger |
| 5,128,595 A | 7/1992 | Hara | 5,545,950 A | 8/1996 | Cho |
| 5,130,909 A | 7/1992 | Gross | 5,559,681 A | 9/1996 | Duarte |
| 5,134,387 A | 7/1992 | Smith et al. | 5,561,346 A | 10/1996 | Byrne |
| 5,136,483 A | 8/1992 | Schoniger et al. | 5,575,459 A | 11/1996 | Anderson |
| 5,142,199 A | 8/1992 | Elwell | 5,575,554 A | 11/1996 | Guritz |
| 5,143,442 A | 9/1992 | Ishikawa et al. | 5,577,832 A | 11/1996 | Lodhie |
| 5,154,641 A | 10/1992 | McLaughlin | 5,583,349 A | 12/1996 | Norman et al. |
| 5,155,669 A | 10/1992 | Yamuro | 5,583,350 A | 12/1996 | Norman et al. |
| 5,161,879 A | 11/1992 | McDermott | 5,592,051 A | 1/1997 | Korkala |
| 5,164,715 A | 11/1992 | Kashiwabara et al. | 5,614,788 A | 3/1997 | Mullins et al. |
| 5,165,778 A | 11/1992 | Matthias et al. | 5,621,282 A | 4/1997 | Haskell |
| 5,173,839 A | 12/1992 | Metz, Jr. | 5,621,603 A | 4/1997 | Adamec et al. |
| 5,184,114 A | 2/1993 | Brown | 5,633,629 A | 5/1997 | Hockstein |
| 5,194,854 A | 3/1993 | Havel | 5,634,711 A | 6/1997 | Kennedy et al. |
| 5,209,560 A | 5/1993 | Taylor et al. | 5,636,303 A | 6/1997 | Che et al. |
| 5,217,285 A | 6/1993 | Sopori | 5,640,061 A | 6/1997 | Bomborst et al. |
| 5,225,765 A | 7/1993 | Callahan et al. | 5,642,129 A | 6/1997 | Zavracky et al. |
| 5,226,723 A | 7/1993 | Chen | 5,642,933 A | 7/1997 | Hitora |
| 5,235,347 A | 8/1993 | Lee | 5,656,935 A | 8/1997 | Havel |
| 5,235,416 A | 8/1993 | Stanhope | 5,668,537 A | 9/1997 | Chansky et al. |
| 5,254,910 A | 10/1993 | Yang | 5,671,996 A | 9/1997 | Bos et al. |
| 5,256,948 A | 10/1993 | Boldin et al. | 5,673,059 A | 9/1997 | Zavracky et al. |
| 5,262,658 A | 11/1993 | Jankowski | 5,684,309 A | 11/1997 | McIntosh et al. |
| 5,268,828 A | 12/1993 | Miura | 5,688,042 A | 11/1997 | Madadi et al. |
| 5,278,542 A | 1/1994 | Smith et al. | 5,701,058 A | 12/1997 | Roth |
| 5,282,121 A | 1/1994 | Bornhorst et al. | 5,707,139 A | 1/1998 | Haitz |
| 5,283,517 A | 2/1994 | Havel | 5,712,650 A | 1/1998 | Barlow |
| 5,287,352 A | 2/1994 | Jackson et al. | 5,721,471 A | 2/1998 | Begemann et al. |
| 5,294,865 A | 3/1994 | Haraden | 5,726,535 A | 3/1998 | Yan |
| 5,298,871 A | 3/1994 | Shimohara | 5,730,013 A | 3/1998 | Huang |
| 5,301,090 A | 4/1994 | Hed | 5,734,590 A | 3/1998 | Tebbe |
| 5,307,295 A | 4/1994 | Taylor et al. | 5,749,646 A | 5/1998 | Brittell |
| 5,329,431 A | 7/1994 | Taylor et al. | 5,751,118 A | 5/1998 | Mortimer |
| 5,350,977 A | 9/1994 | Hamamoto et al. | 5,752,766 A | 5/1998 | Bailey et al. |
| 5,352,957 A | 10/1994 | Werner | 5,769,527 A | 6/1998 | Taylor et al. |
| 5,357,170 A | 10/1994 | Luchaco et al. | 5,782,555 A | 7/1998 | Hochstein |
| 5,371,618 A | 12/1994 | Tai et al. | 5,784,006 A | 7/1998 | Hochstein |
| 5,374,876 A | 12/1994 | Horibata et al. | 5,790,329 A | 8/1998 | Klaus et al. |
| 5,375,043 A | 12/1994 | Tokunaga | 5,803,579 A | 9/1998 | Turnbull et al. |
| 5,381,074 A | 1/1995 | Rudzewicz et al. | 5,806,965 A | 9/1998 | Deese |
| 5,384,519 A | 1/1995 | Gotoh | 5,808,592 A | 9/1998 | Mizutani et al. |
| 5,386,351 A | 1/1995 | Tabor | 5,808,689 A | 9/1998 | Small |
| 5,388,357 A | 2/1995 | Malita | 5,812,105 A | 9/1998 | Van de Ven |
| 5,400,228 A | 3/1995 | Kao | 5,821,695 A | 10/1998 | Vilanilam et al. |
| 5,402,702 A | 4/1995 | Hata | 5,828,178 A | 10/1998 | York et al. |
| 5,404,282 A | 4/1995 | Klinke et al. | 5,831,686 A | 11/1998 | Beretta |
| 5,406,176 A | 4/1995 | Sugden | 5,836,676 A | 11/1998 | Ando et al. |
| 5,410,328 A | 4/1995 | Yoksza et al. | 5,838,247 A | 11/1998 | Bladowski |
| 5,412,284 A | 5/1995 | Moore et al. | 5,848,837 A | 12/1998 | Gustafson |
| 5,412,552 A | 5/1995 | Fernandes | 5,850,126 A | 12/1998 | Kanbar |
| 5,420,482 A | 5/1995 | Phares | 5,851,063 A | 12/1998 | Doughty et al. |
| 5,421,059 A | 6/1995 | Leffers, Jr. | 5,852,658 A | 12/1998 | Knight et al. |
| 5,432,408 A | 7/1995 | Matsuda et al. | 5,854,542 A | 12/1998 | Forbes |
| 5,436,535 A | 7/1995 | Yang | RE36,030 E | 1/1999 | Nadeau |
| 5,436,853 A | 7/1995 | Shimohara | 5,857,767 A | 1/1999 | Hochstein |
| 5,450,301 A | 9/1995 | Waltz et al. | 5,859,508 A | 1/1999 | Ge et al. |
| 5,461,188 A | 10/1995 | Drago et al. | 5,893,631 A | 4/1999 | Padden |
| 5,463,280 A | 10/1995 | Johnson | 5,894,196 A | 4/1999 | McDermott |
| 5,465,144 A | 11/1995 | Parker et al. | 5,895,986 A | 4/1999 | Walters et al. |
| 5,471,052 A | 11/1995 | Ryczek | 5,896,010 A | 4/1999 | Mikolajczak et al. |
| 5,475,300 A | 12/1995 | Havel | 5,902,166 A | 5/1999 | Robb |
| 5,475,368 A | 12/1995 | Collins | 5,907,742 A | 5/1999 | Johnson et al. |
| 5,489,827 A | 2/1996 | Xia | 5,912,653 A | 6/1999 | Fitch |
| 5,491,402 A | 2/1996 | Small | 5,924,784 A | 7/1999 | Chliwny et al. |
| 5,493,183 A | 2/1996 | Kimball | 5,927,845 A | 7/1999 | Gustafson et al. |
| 5,504,395 A | 4/1996 | Johnson et al. | 5,938,321 A | 8/1999 | Bos et al. |
| 5,515,136 A | 5/1996 | Nishio et al. | 5,946,209 A | 8/1999 | Eckel et al. |
| 5,519,496 A | 5/1996 | Borgert et al. | 5,952,680 A | 9/1999 | Strite |
| 5,528,474 A | 6/1996 | Roney et al. | 5,959,316 A | 9/1999 | Lowery |
| 5,530,322 A | 6/1996 | Ference et al. | 5,959,547 A | 9/1999 | Tubel et al. |
| 5,535,230 A | 7/1996 | Abe | 5,961,201 A | 10/1999 | Gismondi |
| 5,541,817 A | 7/1996 | Hun | 5,963,185 A | 10/1999 | Havel |

| | | | | | | |
|---|---|---|---|---|---|---|
| 5,974,553 | A | 10/1999 | Gandar | 6,441,558 B1 | 8/2002 | Muthu et al. |
| 5,980,064 | A | 11/1999 | Metroyanis | 6,445,139 B1 | 9/2002 | Marshall et al. |
| 5,982,957 | A | 11/1999 | DeCaro et al. | 6,448,550 B1 | 9/2002 | Nishimura |
| 5,982,969 | A | 11/1999 | Sugiyama et al. | 6,459,919 B1 | 10/2002 | Lys et al. |
| 5,998,925 | A | 12/1999 | Shimizu et al. | 6,469,322 B1 | 10/2002 | Srivastava et al. |
| 6,008,783 | A | 12/1999 | Kitagawa et al. | 6,474,837 B1 | 11/2002 | Belliveau |
| 6,016,038 | A | 1/2000 | Mueller et al. | 6,495,964 B1 | 12/2002 | Muthu et al. |
| 6,018,237 | A | 1/2000 | Havel | 6,498,355 B1 | 12/2002 | Harrah et al. |
| 6,020,825 | A | 2/2000 | Chansky et al. | 6,504,301 B1 | 1/2003 | Lowery |
| 6,023,255 | A | 2/2000 | Bell | 6,507,159 B2 | 1/2003 | Muthu |
| 6,025,550 | A | 2/2000 | Kato | 6,508,564 B1 | 1/2003 | Kuwabara et al. |
| 6,028,694 | A | 2/2000 | Schmidt | 6,510,995 B2 | 1/2003 | Muthu et al. |
| 6,031,343 | A | 2/2000 | Recknagel et al. | 6,513,949 B1 | 2/2003 | Marshall et al. |
| 6,056,420 | A | 5/2000 | Wilson et al. | 6,528,954 B1 | 3/2003 | Lys et al. |
| 6,066,861 | A | 5/2000 | Höhn et al. | 6,548,967 B1 | 4/2003 | Dowling et al. |
| 6,068,383 | A | 5/2000 | Robertson et al. | 6,550,952 B1 | 4/2003 | Hulse et al. |
| 6,069,597 | A | 5/2000 | Hansen | 6,551,282 B1 | 4/2003 | Exline et al. |
| 6,072,280 | A | 6/2000 | Allen | 6,552,495 B1 | 4/2003 | Chang |
| 6,092,915 | A | 7/2000 | Rensch | 6,568,834 B1 | 5/2003 | Scianna |
| 6,095,661 | A | 8/2000 | Lebens et al. | 6,576,930 B2 | 6/2003 | Reeh et al. |
| 6,097,352 | A | 8/2000 | Zavracky et al. | 6,577,080 B2 | 6/2003 | Lys et al. |
| 6,127,783 | A | 10/2000 | Pashley et al. | 6,577,287 B2 | 6/2003 | Havel |
| 6,132,072 | A | 10/2000 | Turnbull et al. | 6,592,238 B2 | 7/2003 | Cleaver et al. |
| 6,135,604 | A | 10/2000 | Lin | 6,592,780 B2 | 7/2003 | Höhn et al. |
| 6,139,172 | A | 10/2000 | Bos et al. | 6,596,977 B2 | 7/2003 | Muthu et al. |
| 6,149,283 | A | 11/2000 | Conway et al. | 6,600,175 B1 | 7/2003 | Baretz et al. |
| 6,150,771 | A | 11/2000 | Perry | 6,608,453 B2 | 8/2003 | Morgan et al. |
| 6,150,774 | A | 11/2000 | Mueller et al. | 6,624,597 B2 | 9/2003 | Dowling et al. |
| 6,158,882 | A | 12/2000 | Bischoff, Jr. | 6,630,691 B1 | 10/2003 | Mueller-Mach et al. |
| 6,161,941 | A | 12/2000 | Tait | 6,630,801 B2 | 10/2003 | Schuurmans |
| 6,166,496 | A | 12/2000 | Lys et al. | 6,636,003 B2 | 10/2003 | Rahm et al. |
| 6,175,201 | B1 | 1/2001 | Sid | 6,692,136 B2 | 2/2004 | Marshall et al. |
| 6,175,342 | B1 | 1/2001 | Nicholson et al. | 6,717,376 B2 | 4/2004 | Lys et al. |
| 6,181,126 | B1 | 1/2001 | Havel | 6,720,745 B2 | 4/2004 | Mueller et al. |
| 6,183,086 | B1 | 2/2001 | Neubert | 6,726,350 B1 | 4/2004 | Herold |
| 6,183,104 | B1 | 2/2001 | Ferrara | 6,774,584 B2 | 8/2004 | Morgan et al. |
| 6,184,628 | B1 | 2/2001 | Ruthenberg | 6,781,329 B2 * | 8/2004 | Mueller et al. .............. 315/297 |
| 6,188,181 | B1 | 2/2001 | Sinha et al. | 6,787,999 B2 | 9/2004 | Stimac et al. |
| 6,190,018 | B1 | 2/2001 | Parsons et al. | 6,788,011 B2 * | 9/2004 | Mueller et al. .............. 315/294 |
| 6,196,471 | B1 | 3/2001 | Ruthenberg | 6,812,500 B2 | 11/2004 | Reeh et al. |
| 6,211,626 | B1 | 4/2001 | Lys et al. | 7,274,160 B2 * | 9/2007 | Mueller et al. .............. 315/312 |
| 6,212,213 | B1 | 4/2001 | Weber et al. | 2001/0033488 A1 | 10/2001 | Chliwn et al. |
| 6,215,409 | B1 | 4/2001 | Blach | 2002/0038157 A1 | 3/2002 | Dowling et al. |
| 6,220,722 | B1 | 4/2001 | Begemann | 2002/0044066 A1 | 4/2002 | Dowling et al. |
| 6,234,645 | B1 | 5/2001 | Borner et al. | 2002/0047569 A1 | 4/2002 | Dowling et al. |
| 6,234,648 | B1 | 5/2001 | Borner et al. | 2002/0047624 A1 | 4/2002 | Stam et al. |
| 6,235,648 | B1 | 5/2001 | Mizuhara et al. | 2002/0048169 A1 | 4/2002 | Dowling et al. |
| 6,245,259 | B1 | 6/2001 | Höhn et al. | 2002/0057061 A1 | 5/2002 | Mueller et al. |
| 6,250,774 | B1 | 6/2001 | Begemann et al. | 2002/0060526 A1 | 5/2002 | Timmermans et al. |
| 6,252,254 | B1 | 6/2001 | Soules et al. | 2002/0070688 A1 | 6/2002 | Dowling et al. |
| 6,252,358 | B1 | 6/2001 | Xydis et al. | 2002/0074559 A1 | 6/2002 | Dowling et al. |
| 6,255,670 | B1 | 7/2001 | Srivastava et al. | 2002/0078221 A1 | 6/2002 | Blackwell et al. |
| 6,259,430 | B1 | 7/2001 | Riddle et al. | 2002/0101197 A1 | 8/2002 | Lys et al. |
| 6,273,338 | B1 | 8/2001 | White | 2002/0130627 A1 | 9/2002 | Dowling et al. |
| 6,273,589 | B1 | 8/2001 | Weber et al. | 2002/0145394 A1 | 10/2002 | Morgan et al. |
| 6,277,301 | B1 | 8/2001 | Höhn et al. | 2002/0145869 A1 | 10/2002 | Dowling |
| 6,283,612 | B1 | 9/2001 | Hunter | 2002/0152045 A1 | 10/2002 | Dowling et al. |
| 6,292,901 | B1 | 9/2001 | Lys et al. | 2002/0153851 A1 | 10/2002 | Dowling et al. |
| 6,294,800 | B1 | 9/2001 | Dual et al. | 2002/0158583 A1 | 10/2002 | Lys et al. |
| 6,299,329 | B1 | 10/2001 | Mui et al. | 2002/0163316 A1 | 11/2002 | Dowling et al. |
| 6,299,338 | B1 | 10/2001 | Levinson et al. | 2002/0171365 A1 | 11/2002 | Moran et al. |
| 6,310,590 | B1 | 10/2001 | Havel | 2002/0171377 A1 | 11/2002 | Mueller et al. |
| 6,323,832 | B1 | 11/2001 | Nishizawa et al. | 2002/0171378 A1 | 11/2002 | Morgan et al. |
| 6,329,764 | B1 | 12/2001 | van de Ven | 2002/0176259 A1 | 11/2002 | Ducharme |
| 6,330,111 | B1 | 12/2001 | Myers | 2002/0195975 A1 | 12/2002 | Dowling et al. |
| 6,331,915 | B1 | 12/2001 | Myers | 2003/0011538 A1 | 1/2003 | Lys et al. |
| 6,340,868 | B1 | 1/2002 | Lys et al. | 2003/0028260 A1 | 2/2003 | Blackwell |
| 6,357,889 | B1 | 3/2002 | Duggal et al. | 2003/0057884 A1 | 3/2003 | Dowling et al. |
| 6,361,198 | B1 | 3/2002 | Reed | 2003/0057886 A1 | 3/2003 | Lys et al. |
| 6,369,525 | B1 | 4/2002 | Chang et al. | 2003/0057887 A1 | 3/2003 | Dowling et al. |
| 6,379,022 | B1 | 4/2002 | Amerson et al. | 2003/0057890 A1 | 3/2003 | Lys et al. |
| 6,386,720 | B1 | 5/2002 | Mochizuki | 2003/0076281 A1 | 4/2003 | Morgan et al. |
| 6,411,046 | B1 | 6/2002 | Muthu | 2003/0100837 A1 | 5/2003 | Lys et al. |

| | | | | | | |
|---|---|---|---|---|---|---|
| 2003/0107887 | A1 | 6/2003 | Eberl | EP | 1 160 883 | 5/2001 |
| 2003/0133292 | A1 | 7/2003 | Mueller et al. | EP | 1113215 | 7/2001 |
| 2003/0137258 | A1 | 7/2003 | Pieas et al. | EP | 1162400 | 12/2001 |
| 2003/0189412 | A1 | 10/2003 | Cunningham | FR | 640 791 | 6/1990 |
| 2003/0198061 | A1 | 10/2003 | Chambers et al. | FR | 88 17359 | 12/1998 |
| 2003/0222587 | A1 | 12/2003 | Dowling et al. | GB | 238327 | 8/1925 |
| 2004/0032226 | A1 | 2/2004 | Lys | GB | 238997 | 9/1925 |
| 2004/0036006 | A1 | 2/2004 | Dowlin | GB | 271212 | 5/1927 |
| 2004/0052076 | A1 | 3/2004 | Mueller et al. | GB | 296884 | 9/1928 |
| 2004/0066652 | A1 | 4/2004 | Hong | GB | 296885 | 9/1928 |
| 2004/0090787 | A1 | 5/2004 | Dowling et al. | GB | 325218 | 2/1930 |
| 2004/0105261 | A1 | 6/2004 | Ducharme et al. | GB | 3683113 | 3/1932 |
| 2004/0130909 | A1 | 7/2004 | Mueller et al. | GB | 376744 | 7/1932 |
| 2004/0218387 | A1 | 11/2004 | Gerlach | GB | 411868 | 6/1934 |
| 2005/0122064 | A1 | 6/2005 | Chevalier et al. | GB | 412217 | 6/1934 |
| 2005/0122292 | A1 | 6/2005 | Schmitz et al. | GB | 438884 | 11/1935 |
| 2005/0122718 | A1 | 6/2005 | Kazar et al. | GB | 441461 | 1/1936 |
| 2005/0128743 | A1 | 6/2005 | Chuey et al. | GB | 480126 | 2/1938 |
| | | | | GB | 481167 | 3/1938 |

FOREIGN PATENT DOCUMENTS

| | | | | | |
|---|---|---|---|---|---|
| CA | 2 134 848 | 12/1996 | GB | 640693 | 9/1950 |
| CA | 2 178 432 | 12/1996 | GB | 646642 | 11/1950 |
| CA | 178 4328 | 12/1996 | GB | 661083 | 11/1951 |
| CH | 253968 | 12/1948 | GB | 685209 | 12/1952 |
| DE | 01950581 | 10/1969 | GB | 686746 | 1/1953 |
| DE | 02243245 | 9/1972 | GB | 712050 | 7/1954 |
| DE | 02315709 | 10/1974 | GB | 718535 | 11/1954 |
| DE | 0205307 | 12/1983 | GB | 942630 | 11/1963 |
| DE | 03526590 A1 | 7/1985 | GB | 2045098 | 10/1980 |
| DE | 3526590 A1 | 1/1986 | GB | 2131589 | 11/1982 |
| DE | 03438154 | 4/1986 | GB | 2135536 | 8/1984 |
| DE | 3837313 | 5/1989 | GB | 2176042 | 12/1986 |
| DE | 3805998 | 9/1989 | GB | 2210720 | 6/1989 |
| DE | 3925767 | 4/1990 | GB | 2239306 A | 6/1991 |
| DE | 8902905 | 5/1990 | JP | 59-166286 | 9/1984 |
| DE | 3917101 | 11/1990 | JP | 61-44694 | 3/1986 |
| DE | 3916875 | 12/1990 | JP | 61-182590 | 8/1986 |
| DE | 4041338 | 7/1992 | JP | 61-182587 | 11/1986 |
| DE | 4130576 | 3/1993 | JP | 63-132990 | 8/1988 |
| DE | 9414688 | 2/1995 | JP | 01031240 B2 | 2/1989 |
| DE | 9414689 | 2/1995 | JP | 2247688 | 10/1990 |
| DE | 4419006 | 12/1995 | JP | 2-269939 | 11/1990 |
| DE | 29607270 | 8/1996 | JP | 03045166 | 2/1991 |
| DE | 19638667 A1 | 9/1996 | JP | 3-98483 | 10/1991 |
| DE | 19525987 | 10/1996 | JP | 4-39235 | 6/1992 |
| DE | 29620583 U1 | 3/1997 | JP | 5-73807 | 10/1993 |
| DE | 19651140 | 6/1997 | JP | 1993073807 U | 10/1993 |
| DE | 19602891 | 7/1997 | JP | 06043830 | 2/1994 |
| DE | 19624087 A1 | 12/1997 | JP | 6334223 | 12/1994 |
| DE | 19829270 A1 | 1/1999 | JP | 07020711 B2 | 1/1995 |
| DE | 20007134 U1 | 9/2000 | JP | 07-129099 | 5/1995 |
| EP | 0 029 474 | 3/1985 | JP | 7-39120 | 7/1995 |
| EP | 390479 | 3/1990 | JP | 7275200 | 10/1995 |
| EP | 507366 | 3/1992 | JP | 07335942 A | 12/1995 |
| EP | 0482680 | 4/1992 | JP | 08-058300 | 3/1996 |
| EP | 0490329 A1 | 6/1992 | JP | 8-106264 | 4/1996 |
| EP | 0495305 | 7/1992 | JP | 08248901 A | 9/1996 |
| EP | 0567280 | 10/1993 | JP | 08293391 A | 11/1996 |
| EP | 629508 | 6/1994 | JP | 08-007611 | 12/1996 |
| EP | 0639938 A1 | 2/1995 | JP | 09007774 A | 1/1997 |
| EP | 0689373 A2 | 12/1995 | JP | 9139289 | 5/1997 |
| EP | 0534710 | 1/1996 | JP | 9152840 | 6/1997 |
| EP | 0701390 A2 | 3/1996 | JP | 09167861 A | 6/1997 |
| EP | 0734082 | 9/1996 | JP | 9269746 | 10/1997 |
| EP | 0752632 A2 | 1/1997 | JP | 10-071951 | 3/1998 |
| EP | 0823812 A3 | 2/1998 | JP | 10-144126 | 5/1998 |
| EP | 0 838 866 | 4/1998 | JP | 2000-149608 | 5/1998 |
| EP | 876085 | 4/1998 | JP | 10242513 A | 9/1998 |
| EP | 0935234 | 8/1999 | JP | 10302514 | 11/1998 |
| EP | 0942631 | 9/1999 | JP | 11039917 A | 2/1999 |
| EP | 0971421 A2 | 1/2000 | JP | 11087770 A | 3/1999 |
| EP | 1020352 | 7/2000 | JP | 11087774 A | 3/1999 |
| | | | JP | 11133891 A | 5/1999 |
| | | | JP | 11-162660 | 6/1999 |

| | | |
|---|---|---|
| JP | 11202330 A | 7/1999 |
| JP | 02000057488 | 2/2000 |
| JP | 3-88205 | 5/2000 |
| JP | 2001-065033 | 3/2001 |
| KR | 1019910009812 | 11/1991 |
| WO | WO 81-00637 | 3/1981 |
| WO | WO 81-01602 | 6/1981 |
| WO | WO 86-05409 | 9/1986 |
| WO | WO 89-05086 | 6/1989 |
| WO | WO 94-18809 | 8/1994 |
| WO | WO 95-13498 | 5/1995 |
| WO | WO 96-11499 | 4/1996 |
| WO | WO 96-41098 | 12/1996 |
| WO | WO 97-48138 | 12/1997 |
| WO | WO 99-06759 | 2/1999 |
| WO | WO 99-30537 | 6/1999 |
| WO | WO 00-14705 | 3/2000 |
| WO | WO 00-19141 | 4/2000 |
| WO | WO 00-33390 | 6/2000 |
| WO | WO 01-24229 | 4/2001 |
| WO | WO 01-73818 | 10/2001 |
| WO | WO 02-01921 | 1/2002 |
| WO | WO 02-061328 | 8/2002 |
| WO | WO 03-053108 | 6/2003 |

OTHER PUBLICATIONS

ARI International, "LED White Caps", www.ari-corp.com, 1999.
Artistic License, AL40000 DMX512 Processors, Revision 3.4, Jun. 2000, Excerpts (Cover, pp. 7,92 through 102.
Artistic License, Miscellaneous Documents (2 sheets Feb. 1995 and Apr. 1996.
Artistic License, Miscellaneous Drawings (3 sheets Jan. 12, 1995.
Asai, et al., "Heat Conductive Wire Matrix Board for Light Emitting Diode (LED) Dot Matrix Display," *Circuit World*, vol. 21, No. 4, 1995, pp. 27-31.
Avitec Licht Design '89-90, pp. 1-4.
Bachiochi, "LEDs Finally Fill the Rainbow," *Circuit Cellar INK*, Apr. 1996, pp. 84-89, Issue #69.
Bass, M, "*Handbook of Optics*," McGraw Hill, USA, 1995, p. 26.33.
Brainard D., "*Colorimetry*", Chapter 26, US, New York, McGraw-Hill, pp. 2601-2654, 1995.
Bremer, D., "LED Advancements Increase Potential," www.ecmag.com, Apr. 2002, p. 115.
Case No. 02 CV 11137MEL in the U.S.D.C., D. Mass., Plaintiffs Complaint and Jury Demand.
Case No. 02 CV 11137MEL in the U.S.D.C., D. Mass., Defendant's Answer and Affirmative Defenses.
Case No. 6:02-cv-270-ORL-I 9JGG in the United States District Court, Middle District of Florida, Orlando Division, Plaintiff's Answers to Defendant's First Set of Interrogatories w/Exhibit 1.
Case No. 6:02-cv-270-ORL-I 9JGG in the United States District Court, Middle District of Florida, Orlando Division, Plaintiff's Amended Verified Complaint.
Case No. 6:02-cv-270-ORL-I 9JGG in the United States District Court, Middle District of Florida, Orlando Division, Defendant's Answer and Counterclaims.
Case No. 6:02-cv-270-ORL-I 9JGG in the United States District Court, Middle District of Florida, Orlando Division, Plantiff's Answer to Counterclaims.
Case No. 6:02-cv-270-ORL-I9JGG in the United States District Court, Middle District of Florida, Orlando Division, Defendant's Answer and Counterclaims.
Case No. 6:02-cv-270-ORL-I9JGG in the United States District Court, Middle District of Florida, Orlando Division, Plaintiff's Answer to Counterclaims.
*Color Kinetics Incorporated v. Super Vision International, Inc.*, "Declaration of Wayne Howell in Opposition to Color Kinetics's Motions for Summary Judgment Against Super Vision International, Inc.," U.S.D.C., D. Mass., Case No. 02 CV 11137 MEL.
*Color Kinetics Incorporated v. Super Vision International, Inc.*, "Declaration of Jerry Laidman in Opposition of Color Kinetics, Inc.'s Motion for Summary Judgment Against Super Vision International, Inc.," U.S.D.C., D. Mass., Case No. 02 CV 11137 MEL.
*Color Kinetics Incorporated v. Super Vision International, Inc.*, "Affidavit' of Alfred D. Ducharme," U.S.D.C., D. Mass., Case No. 02 CV 11137 MEL.
*Color Kinetics Incorporated v. Super Vision International, Inc.*, "Declaration of Clive Mitchell in Opposition of Color Kinetics Inc.'s Motion for Summary Judgment Against Super Vision International, Inc.," U.S.D.C., D. Mass., Case No. 02 CV 11137 MEL.
*Color Kinetics Incorporated v. Super Vision International, Inc.*, "Declaration of Bruce Hagopian in Support of Super Vision International, Inc.'s Motion for Summary Judgment Against Color Kinetics, Inc.," U.S.D.C., Mass., Case No. 02 CV 11137 MEL.
*Color Kinetics Incorporated v. Super Vision International, Inc.*, "Declaration of William Little in Opposition to Color Kinetic's Motions for Summary Judgment Against Super Vision International, Inc.," U.S.D.C., D. Mass., Case No. 02 CV 11137 MEL.
*Color Kinetics Incorporated v. Super Vision International, Inc.*, "Super Vision Intentional, Inc.'s Notice of Filing Declaration of Brent W. Brown," U.S.D.C., D. Mass., Case No. 02 CV 11137 MEL.
*Color Kinetics Incorporated v. Super Vision International, Inc.*, "Super Vision International, Inc.'s Notice of Filing Amended Declaration of George G. Izenour," U.S.D.C., D. Mass., Case No. 02 CV 11137 MEL.
*Color Kinetics Incorporated v Super Vision International, Inc.*, "Super Vision International Inc.'s Notice of Filing Declaration of Paul A. Miller," U.S.D.C., D. Mass., Case No. 02 CV 11137 MEL.
*Color Kinetics Incorporated v. Super Vision International, Inc.*, "Declaration of Brett Kingstone in Opposition to Color Kinetic's Motion for Summary Judgment Against Super Vision International, Inc.," U.S.D.C., D. Mass., Case No. 02 CV 11137 MEL.
*Color Kinetics Incorporated v. Super Vision International, Inc.*, Expert Witness Rebuttal Report of Dr. David I. Kennedy Prepared and Submitted on Behalf of Super Vision International, Inc., United States District Court District of Massachusetts, Case No. 02 CV 11137 MEL.
*Color Kinetics Incorporated v. Super Vision International, Inc.*, Super Vision International, Inc.'s Motion for Summary Judgment Against Color Kinetics, Inc., United States District Court District of Massachusetts, Case No. 02 CV 11137 MEL.
*Color Kinetics Incorporated v. Super Vision International, Inc.*, Color Kinetics' Memorandum in Support of its Motion for Summary Judgment on the Issue of Infringement, United States District Court District of Massachusetts, Case No. 02 CV 11137 MEL.
*Color Kinetics Incorporated v. Super Vision International, Inc.*, Color Kinetics' Memorandum in Support of its Motion for Summary Judgment on the Issue of Invalidity, United States District Court District of Massachusetts, Case No. 02 CV 11137 MEL.
*Color Kinetics Incorporated v. Super Vision International, Inc.*, Color Kinetics' Memorandum in Support of its Motion for Summary Judgment on Super Vision's 'Badmouthing' Claims United States District Court District of Massachusetts, Case No. 02 CV 11137 MEL.
*Color Kinetics Incorporated v. Super Vision International, Inc.*, Color Kinetics' Memorandum in Support of its Motion for Summary Judgment on the Issue of Inequitable Conduct United States District Court District of Massachusetts, Case No. 02 CV 11137 MEL.
*Color Kinetics Incorporated v. Super Vision International, Inc.*, "Color Kinetics' Opening Memorandum Concerning Claim Construction" United States District Court District of Massachusetts, Case No. 02 CV 11137 MEL.
*Color Kinetics Incorporated v. Super Vision International, Inc.*, "Super Vision International, Inc.'s Response to Color Kinetics' Motion for Summary Judgment on the Issue of Inequitable Conduct. United States District Court, Case No. 02 CV 11137 MEL,".
*Color Kinetics Incorporated v. Super Vision International, Inc.*, "Super Vision International Inc.'s Response to Color Kinetics' Motion for Summary Judgment on the Issue of Infringement" United States District Court, Case No. 02 CV 11137 MEL.
*Color Kinetics Incorporated v. Super Vision International, Inc.*, "Super Vision International, Inc.'s Response to Color Kinetics' Motion for Summary Judgment on the Issue of Invalidity" United States District Court, Case No. 02 CV 11137 MEL.

*Color Kinetics Incorporated* v. *Super Vision International, Inc.*, "Super Vision International, Inc.'s Response to Color Kinetics' Opening Memorandum Concerning Claim Construction" United States District Court, Case No. 02 CV 11137 MEL.

*Color Kinetics Incorporated* v. *Super Vision International, Inc.*, "Color Kinetics' Memorandum in Support of its Motion for Summary Judgment on the Issue of Infringement" United States District Court, Case No. 02 CV 11137 MEL.

*Color Kinetics* v. *Super Vision International, Inc.*, "Preliminary Expert Witness Report of Dr. David 1. Kennedy Prepared and Submitted on Behalf of Super Vision International, Inc.," United States District Court of Massachusetts Case No. 02 CV 11137 MEL.

Cree Research, Inc. Announces Acquisition of Full-Color LED Display Company, *PR Newswire*, Aug. 9, 1994, pp. 1-2.

Cree Research, Inc. Announces Fiscal 1994 Returns, *PR Newswire*, Jul. 28, 1994, pp. 1-2.

Des Keppel, "Tech Tips, Pulse Adding Circuit," *ETI* Nov. 1986.

DS2003 / DA9667 / DS2004 High Current / Voltage Darlington Drivers, National Semiconductor Corporation, Dec. 1995, 1-8.

DS2003 / DA9667 / DS2004 High Current / Voltage Darlington Drivers, National Semiconductor Corporation, Dec. 1995, p. 1-8.

DS96177 RS-485 / RS-422 Differential Bus Repeater, National Semiconductor Corporation, Feb. 1996, 1-8.

Effer, D., et al., "Fabrication and Properties of Gallium Phosphide Variable Colour Displays," Jul. 1973.

Ettlinger, et al., "A CBS Computerized Lighting Control System," *Journal of the SMPTE*, Apr. 1972, pp. 277-281, vol. 81.

Furry, et al., Affidavit, LED effects, Feb. 22, 2002, pp. 24-29.

Gansland et al., "Handbuch der Lichtplanung," Vieweg + Sohn, Wiesbaden, 1992.

Girardet, V., "Handbuch fur Beleuchtung," Essen, Germany 1975.

Hewlett Packard Components, "Solid State Display and Optoelectronics," *Designer's Catalog*, pp. 30-43, Jul. 1973.

High End Systems, Inc., *Trackspot User Manual*, Aug. 1997, Excerpts (Cover, Title page, pp. ii through iii and 2-13 through 2-14).

http://www.luminus.cx/projects/chaser, (Nov. 13, 2000) 1-16.

iLight Technologies, "Curved or straight in white or color", http://www.ilight-tech.co dproducts.htm, Sep. 7, 2004, 1 page.

iLight Technologies, "Curved or straight in white or color",/products_white.htm, Sep. 7, 2004, 1 page.

iLight Technologies, "Explore the iLight Possibilities", hLtp://www.ilight-tech.com , Sep. 7, 2004, 1 page.

Intec Research, Trackspot, http://www.intec-research.com/trackspot.htm, pp. 1-4, Apr. 24, 2003.

Irving, D., "Techniques of Stage and Studio Lighting Control," *Proceedings of the IREE*, Nov. 1975, pp. 359-364/.

John. R. "Binary Complementary Synthetic-White LED Illuminators", SAE Technical Paper Series, resented at the International Congress and Exposition; Detroit, Michigan, Mar. 1-4, 1999.

Kennedy, D. "Fabrication and Properties of Gallium Phosphide Variable Colour Displays," *Microelectronics*, vol. 5, No. 3, 1974, pp. 21-29.

Koga, et al., "RGB Multi-Color LED DOT-Matrix Units and Their Application to Large-Size Flat Displays," *Optoelectronics-Devices and Technologies*, vol. 7, No. 2, pp. 221-229, Dec. 1992.

LEDtronics, Inc., LEDtronics Press Releases, "Conversion to LED System Provides Safe, Cost-Effective Lighting for Safelight Manufacturing," and "Ultra-Bright LED Replacements Offered for Industrial Control, Motor Control, *Pilot Lights*," Jun. 30, 1997.

Lerner, et al., "Material Advances Light Full-Color LED Displays," Laser Focus World, Mar. 1997, pp. 119-124.

LM117/LM317A/LM317 3-Terminal Adjustable Regulator, National Semiconductor Corporation, May 1997, 1-20.

LM140A / LM140 / LM340 A / LM78000 Series 3—Terminal Positive Regulators, National Semiconductor Corporation, Jan. 1995, 1-14.

Longo, L., "LEDS Lead the Way," *Home Lighting & Accessories*, Jun. 2002, pp. 226-234.

MacGregor et al., "Solid-State Displays for CRT Replacement in Data Annotation Systems," Optotek Limited, Proceedings, IEEE-SID Conference on Display, *Devices and Systems*, 1974, Washington, DC, pp. 59-65.

Mishiko, et al., "Large-Scale Color LED Display System," *National Technical Report*, vol. 33, No. 1, Feb. 1987, pp. 94-101.

Miyoshi, et al., "Large-Scale Color LED Stock-Information Display Board," *National Technical Report*, vol. 33, No. 1, Feb. 1987, pp. 102-107.

Morrison D., "Brighter LEDs Signal Longer Life And Lower Power For Lighting Applications", www.planetee.com, Dec. 2000.

Motozono, et al., "LED Display Devices," *National Technical Report*, vol. 28, No. 1, Feb. 1982, pp. 74-82.

Muir, N., "Dual Colour LED Driver," *ETI* Nov. 1986.

Multicolour Pendant, *Maplin Magazine*, Dec. 1981.

Munch, W., "Fortschritte in der Bewertung der Farbwiedergabe durch Lichtquellen." Tagungsbericht uber das IV, Internationale Kolloquium an der Hochschule fur Elektronik Ilmenau, Oct. 1959.

Murata, "Developers Continue to Refine Blue LED Technologies for Display Use," *Display Devices*, 1992, serial No. 6, pp. 46-50.

Murata, "SiC Brightens for Full-Color LED Display Units," *JEE*, Nov. 1993, pp. 59-65.

Nakamura, S., "The Blue Laser Diode," *Seiten* 7-10, pp. 216-221, Springer Verlag, Berlin, Germany, 1997.

Newnes's Dictionary of Electronics, Fourth Edition, S. W. Amos, et al., Preface to First Edition, pp. 278-279 http://www.luminus.cx/rojects/chaser, (Nov. 13, 2000), 1-16.

Open Letter to the USPTO, Oct. 14, 2004, httD://www.artisticlicense.com/app.notes/appnote027.pdf; http://www.artistielicense.com/appnotes/apynote015.pdf, pp. 1-17.

Opposition Brief, May 10, 2006, by ERCO Leuchten GmbH, opposing European Patent No. 1234140, pp. 1-20.

Opposition Brief, May 10, 2006, by Koniklijke Philips Electronics N.V., opposing European Patent No. 1234140, pp. 1-24.

Opposition Brief, May 4, 2006, by Tridonic Atco GmbH and Co. KG, opposing European Patent No. 1234140, pp. 1-21.

Opposition Brief, May 8, 2006, by Osram GmbH, opposing European Patent No. 1234140, pp. 1-21.

Optotek Limited, Technical Manual for Multicolor Interactive Switch Module AN-601 and Input Simulator AN-600, Sep. 1986.

Putman, P., "The Allure of LED," www.sromagazine.biz, Jun./Jul. 2002, pp. 47-52.

Schlig, "Electrothermal Considerations in Display Applications of Light-Emitting Diodes," IEEE Transactions on Electron Devices, vol. ED-19, No. 7, Jul. 1982, pp. 847-851.

Sharp, Optoelectronics Data Book, pp. 1096-1097, 1994/1995.

Shibata, "Improvements in Multicolored LEDs May be Practical Display Alternative," *JEE*, Aug. 1985, pp. 60-62.

Solid-State Dark Room Lighting, *Elektor*, Oct. 1983.

Spiger, R., "LED Multifunction Keyboard Engineering Study," Jun. 1983.

Tsujikado, et al., "Large-Scale LED Display System," *National Technical Report*, vol. 42, No. 3, Jun. 1996, pp. 18-25.

Wareberg, et al., "Flat-Panel Video Resolution LED Display System," Optotek Limited, IEEE, 1982, 746-751.

\* cited by examiner

MULTICOLORED LED LIGHTING METHOD AND APPARATUS

CROSS REFERENCES TO RELATED APPLICATIONS

This application is a continuation of application Ser. No. 10/810,481 filed Mar. 26, 2004, which is a continuation of application Ser. No. 09/971,367, filed on Oct. 4, 2001, now U.S. Pat. No. 6,788,011, which is a continuation of application Ser. No. 09/669,121, filed on Sep. 25, 2000, now U.S. Pat. No. 6,806,659, which is a continuation of application Ser. No. 09/425,770, filed Oct. 22, 1999, now U.S. Pat. No. 6,150,774, which is a continuation of application Ser. No. 08/920,156, filed Aug. 26, 1997, now U.S. Pat. No. 6,016,038. Each of the foregoing applications is hereby incorporated herein by reference.

BACKGROUND OF THE INVENTION

The present invention relates to providing light of a selectable color using LEDs. More particularly, the present invention is a method and apparatus for providing multicolored illumination. More particularly still, the present invention is an apparatus for providing a computer controlled multicolored illumination network capable of high performance and rapid color selection and change.

It is well known that combining the projected light of one color with the projected light of another color will result in the creation of a third color. It is also well known that the three most commonly used primary colors—red, blue and green—can be combined in different proportions to generate almost any color in the visible spectrum. The present invention takes advantage of these effects by combining the projected light from at least two light emitting diodes (LEDs) of different primary colors.

Computer lighting networks are not new. U.S. Pat. No. 5,420,482, issued to Phares, describes one such network that uses different colored LEDs to generate a selectable color. Phares is primarily for use as a display apparatus. However, the apparatus has several disadvantages and limitations. First, each of the three color LEDs in Phares is powered through a transistor biasing scheme in which the transistor base is coupled to a respective latch register through biasing resistors. The three latches are all simultaneously connected to the same data lines on the data bus. This means it is impossible in Phares to change all three LED transistor biases independently and simultaneously. Also, biasing of the transistors is inefficient because power delivered to the LEDs is smaller than that dissipated in the biasing network. This makes the device poorly suited for efficient illumination applications. The transistor biasing used by Phares also makes it difficult, if not impossible, to interchange groups of LEDs having different power ratings, and hence different intensity levels.

U.S. Pat. No. 4,845,481, issued to Havel, is directed to a multicolored display device. Havel addresses some, but not all of the switching problems associated with Phares. Havel uses a pulse width modulated signal to provide current to respective LEDs at a particular duty cycle. However, no provision is made for precise and rapid control over the colors emitted. As a stand alone unit, the apparatus in Havel suggests away from network lighting, and therefore lacks any teaching as to how to implement a pulse width modulated computer lighting network. Further, Havel does not appreciate the use of LEDs beyond mere displays, such as for illumination.

U.S. Pat. No. 5,184,114, issued to Brown, shows an LED display system. But Brown lacks any suggestion to use LEDs for illumination, or to use LEDs in a configurable computer network environment. U.S. Pat. No. 5,134,387, issued to Smith et al., directed to an LED matrix display, contains similar problems. Its rudimentary cur-rent control scheme severely limits the possible range of colors that can be displayed.

It is an object of the present invention to overcome the limitations of the prior art by providing a high performance computer controlled multicolored LED lighting network.

It is a further object of the present invention to provide a unique LED lighting network structure capable of both a linear chain of nodes and a binary tree configuration.

It is still another object of the present invention to provide a unique heat-dissipating housing to contain the lighting units of the lighting network.

It is yet another object of the present invention to provide a current regulated LED lighting apparatus, wherein the apparatus contains lighting modules each having its own maximum current rating and each conveniently interchangeable with one another.

It is a still further object of the present invention to provide a unique computer current-controlled LED lighting assembly for use as a general illumination device capable of emitting multiple colors in a continuously programmable 24-bit spectrum.

It is yet a still further object of the present invention to provide a unique flashlight, inclinometer, thermometer, general environmental indicator and light bulb, all utilizing the general computer current-control principles of the present invention.

Other objects of the present invention will be apparent from the detailed description below.

SUMMARY OF THE INVENTION

In brief, the invention herein comprises a pulse width modulated current control for an LED lighting assembly, where each current-controlled unit is uniquely addressable and capable of receiving illumination color information on a computer lighting network. In a further embodiment, the invention includes a binary tree network configuration of lighting units (nodes). In another embodiment, the present invention comprises a heat dissipating housing, made out of a heat-conductive material, for housing the lighting assembly. The heat dissipating housing contains two stacked circuit boards holding respectively the power module and the light module. The light module is adapted to be conveniently interchanged with other light modules having programmable current, and hence maximum light intensity ratings. Other embodiments of the present invention involve novel applications for the general principles described herein.

DESCRIPTION OF THE DRAWINGS

FIGS. 2B-1 and 2B-2 respectively illustrate a linear chain of nodes (daisy chain configuration) and a binary tree configuration of a network according to various embodiments of the present invention.

DETAILED DESCRIPTION

Figure 1:
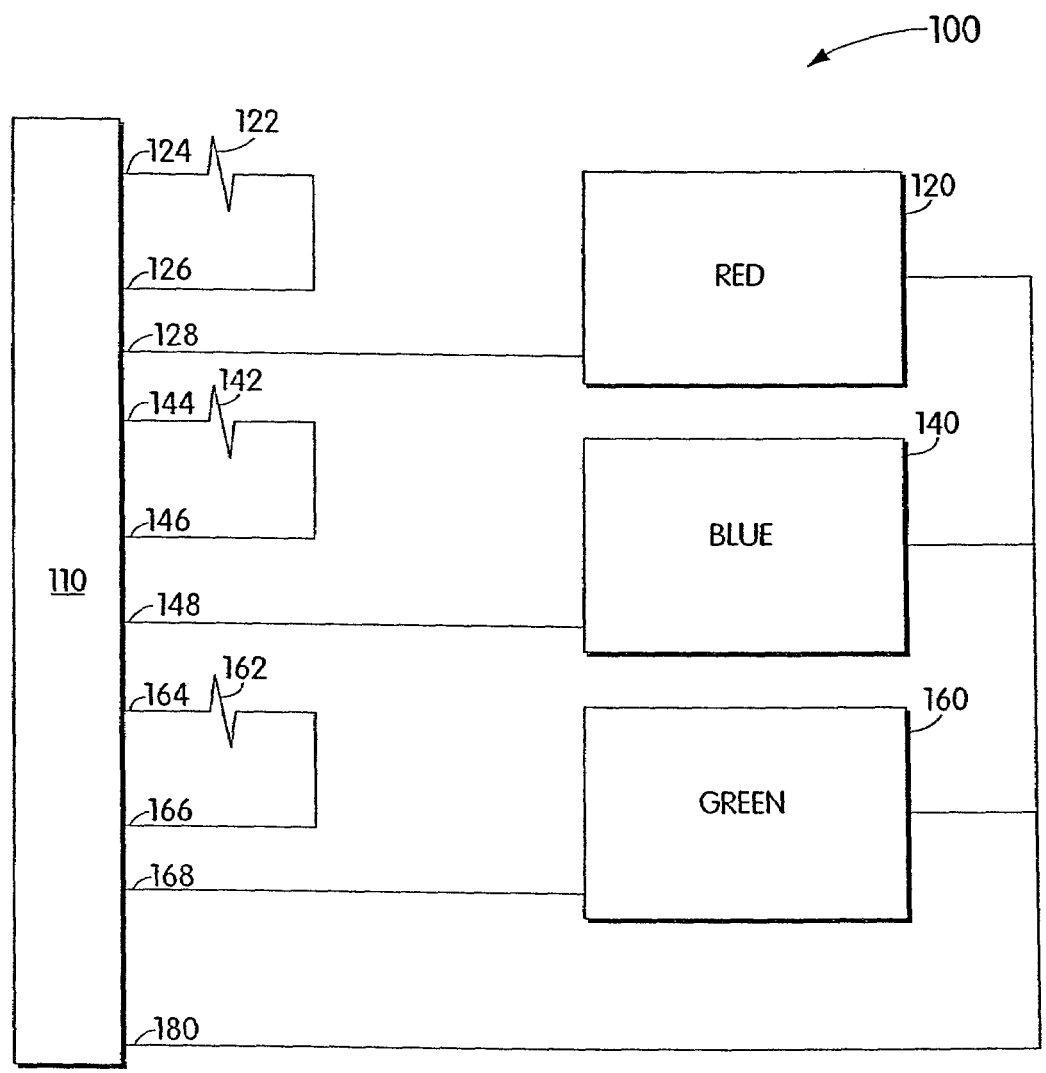
FIG. 1 is a stylized electrical circuit schematic of the light module of the present invention.
Figure 4:
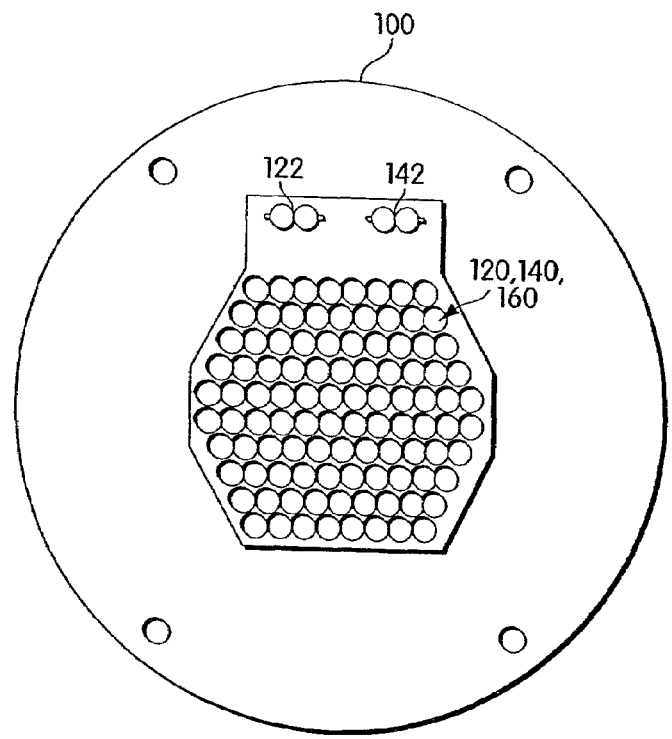
FIG. 4 is a plan view of the LED-containing side of the light module of the present invention.
Figure 5:
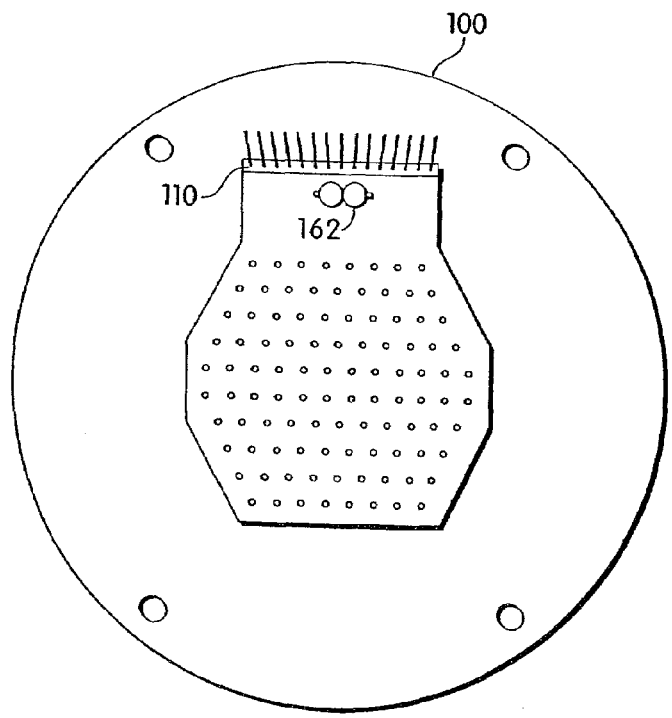
FIG. 5 is a plan view of the electrical connector side of the light module of the present invention.

The structure and operation of a preferred embodiment will now be described. It should be understood that many other ways of practicing the inventions herein are available, and the embodiments described herein are exemplary and not limiting. Turning to FIG. 1, shown is an electrical schematic representation of a light module 100 of the present invention. FIGS. 4 and 5 show the LED-containing side and the electrical connector side of light module 100. Light module 100 is self-contained, and is configured to be a standard item interchangeable with any similarly constructed light module. Light module 100 contains a ten-pin electrical connector 110 of the general type. In this embodiment, the connector 110 contains male pins adapted to fit into a complementary ten-pin connector female assembly, to be described below. Pin 180 is the power supply. A source of DC electrical potential enters module 100 on pin 180. Pin 180 is electrically connected to the anode end of light emitting diode (LED) sets 120, 140 and 160 to establish a uniform high potential on each anode end.

LED set 120 contains red LEDs, set 140 contains blue and set 160 contains green, each obtainable from the Nichia America Corporation. These LEDs are primary colors, in the sense that such colors when combined in preselected proportions can generate any color in the spectrum. While three primary colors is preferred, it will be understood that the present invention will function nearly as well with only two primary colors to generate any color in the spectrum. Likewise, while the different primary colors are arranged herein on sets of uniformly colored LEDs, it will be appreciated that the same effect may be achieved with single LEDs containing multiple color-emitting semiconductor dies. LED sets 120, 140 and 160 each preferably contains a serial/parallel array of LEDs in the manner described by Okuno in U.S. Pat. No. 4,298,869, incorporated herein by reference. In the present embodiment, LED set 120 contains three parallel connected rows of nine red LEDs (not shown), and LED sets 140 and 160 each contain five parallel connected rows of five blue and green LEDs, respectively (not shown). It is understood by those in the art that, in general, each red LED drops the potential in the line by a lower amount than each blue or green LED, about 2.1 V, compared to 4.0 V, respectively, which accounts for the different row lengths. This is because the number of LEDs in each row is determined by the amount of voltage drop desired between the anode end at the power supply voltage and the cathode end of the last LED in the row. Also, the parallel arrangement of rows is a fail-safe measure that ensures that the light module 100 will still function even if a single LED in a row fails, thus opening the electrical circuit in that row. The cathode ends of the three parallel rows of nine red LEDs in LED set 120 are then connected in common, and go to pin 128 on connector 110. Likewise, the cathode ends of the five parallel rows of five blue LEDs in LED set 140 are connected in common, and go to pin 148 on connector 110. The cathode ends of the five parallel rows of five green LEDs in LED set 160 are connected in common, and go to pin 168 on connector 110. Finally, on light module 100, each LED set is associated with a programming resistor that combines with other components, described below, to program the maximum current through each set of LEDs. Between pin 124 and 126 is resistor 122, 6.2 Ohms. Between pin 144 and 146 is resistor 142, 4.7 Ohms. Between pin 164 and 166 is resistor 162, 4.7 Ohms. Resistor 122 programs maximum current through red LED set 120, resistor 142 programs maximum current through blue LED set 140, and resistor 162 programs maximum current through green LED set 160. The values these resistors should take are determined empirically, based on the desired maximum light intensity of each LED set. In the present embodiment, the resistances above program red, blue and green currents of 70, 50 and 50 A, respectively.

Figure 2:
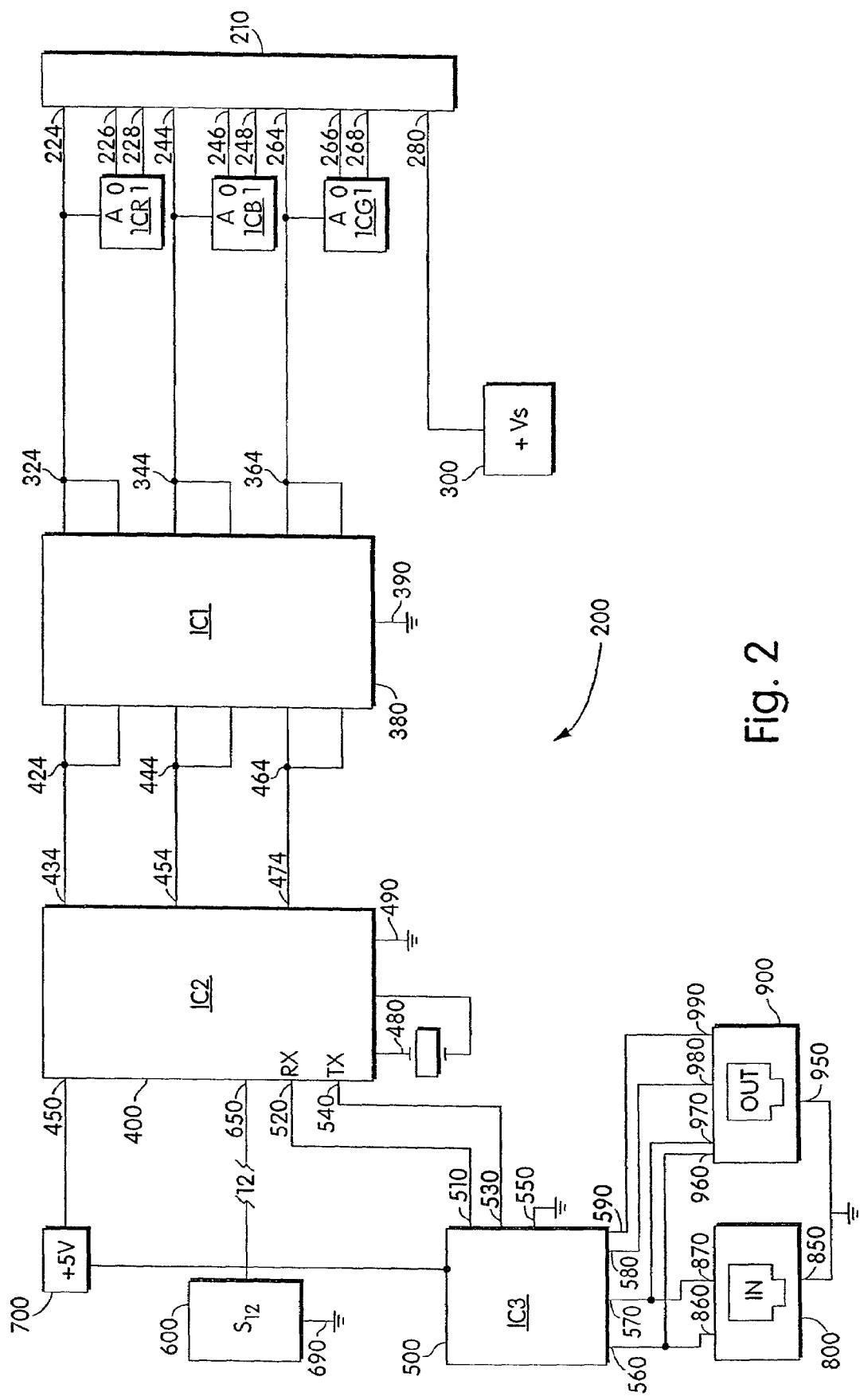
FIG. 2 is a stylized electrical circuit schematic of the power module of the present invention.
Figure 6:
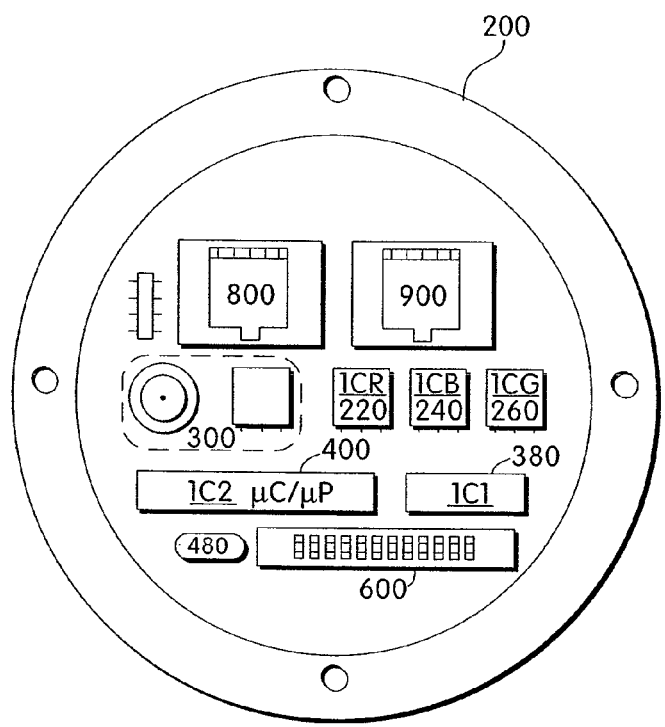
FIG. 6 is a plan view of the power terminal side of the power module of the present invention.
Figure 7:
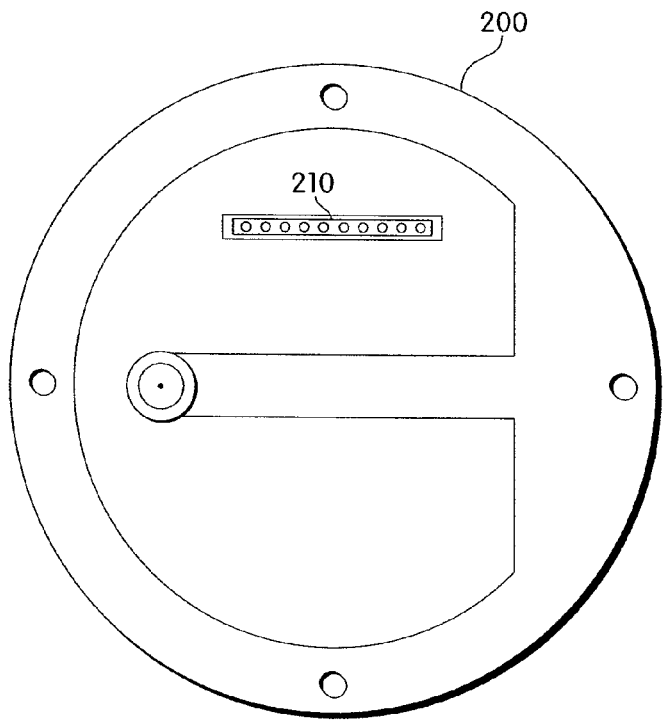
FIG. 7 is a plan view of the electrical connector side of the power module of the present invention.

With the electrical structure of light module 100 described, attention will now be given to the electrical structure of power module 200, shown in FIG. 2. FIGS. 6 and 7 show the power terminal side and electrical connector side of an embodiment of power module 200. Like light module 100, power module 200 is self contained. Interconnection with male pin set 110 is achieved through complementary female pin set 210. Pin 280 connects with pin 180 for supplying power, delivered to pin 280 from supply 300. Supply 300 is shown as a functional block for simplicity. In actuality, supply 300 can take numerous forms for generating a DC voltage. In the present embodiment, supply 300 provides 24 Volts through a connection terminal (not shown), coupled to pin 280 through transient protection capacitors (not shown) of the general type. It will be appreciated that supply 300 may also supply a DC voltage after rectification and/or voltage transformation of an AC supply, as described more fully in U.S. Pat. No. 4,298,869.

Also connected to pin connector 210 are three current programming integrated circuits, ICR 220, ICB 240 and ICG 260. Each of these is a three terminal adjustable regulator, preferably part number LM317B, available from the National Semiconductor Corporation, Santa Clara, Calif. The teachings of the LM317 datasheet are incorporated herein by reference. Each regulator contains an input terminal, an output terminal and an adjustment terminal, labeled I, O and A, respectively. The regulators function to maintain a constant maximum current into the input terminal and out of the output terminal. This maximum current is pre-programmed by setting a resistance between the output and the adjustment terminals. This is because the regulator will cause the voltage at the input terminal to settle to whatever value is needed to cause 1.25 V to appear across the fixed current set resistor, thus causing constant current to flow. Since each functions identically, only ICR 220 will now be described. First, current enters the input terminal of ICR 220 from pin 228. Of course, pin 228 in the power module is coupled to pin 128 in the light module, and receives current directly from the cathode end of the red LED set 120. Since resistor 122 is ordinarily disposed between the output and adjustment terminals of ICR 220 through pins 224/124 and 226/126, resistor 122 programs the amount of current regulated by ICR 220. Eventually, the current output from the adjustment terminal of ICR 220 enters a Darlington driver. In this way, ICR 220 and associated resistor 122 program the maximum current through red LED set 120. Similar results are achieved with ICB 240 and resistor 142 for blue LED set 140, and with ICG 260 and resistor 162 for green LED set 160.

The red, blue and green LED currents enter another integrated circuit, IC1 380, at respective nodes 324, 344 and 364. IC1 380 is preferably a high current/voltage Darlington driver, part no. DS2003 available from the National Semiconductor Corporation, Santa Clara, Calif. IC1 380 is used as a current sink, and functions to switch current between respective LED sets and ground 390. As described in the DS2003 datasheet, incorporated herein by reference, IC1 contains six sets of Darlington transistors with appropriate on-board biasing resistors. As shown, nodes 324, 344 and 364 couple the current from the respective LED sets to three pairs of these Darlington transistors, in the well known manner to take advantage of the fact that the current rating of IC1 380 may be doubled by using pairs of Darlington transistors to sink respective currents. Each of the three on-board Darlington pairs is used in the following manner as a switch. The base of each Darlington pair is coupled to signal inputs 424, 444 and 464, respectively. Hence, input 424 is the signal input for switching current through node 324, and thus the red LED set 120. Input 444 is the signal input for switching current through node 344, and thus the blue LED set 140. Input 464 is the signal input for switching current through node 364, and thus the green LED set 160. Signal inputs 424, 444 and 464 are coupled to respective signal outputs 434, 454 and 474 on microcontroller IC2 400, as described below. In essence, when a high frequency square wave is incident on a respective signal input, IC1 380 switches current through a respective node with the identical frequency and duty cycle. Thus, in operation, the states of signal inputs 424, 444 and 464 directly correlate with the opening and closing of the power circuit through respective LED sets 120, 140 and 160.

The structure and operation of microcontroller IC2 400 will now be described. Microcontroller IC2 400 is preferably a MICROCHIP brand PIC16C63, although almost any properly programmed microcontroller or microprocessor can perform the software functions described herein. The main function of microcontroller IC2 400 is to convert numerical data received on serial Rx pin 520 into three independent high frequency square waves of uniform frequency but independent duty cycles on signal output pins 434, 454 and 474. The FIG. 2 representation of microcontroller IC2 400 is partially stylized, in that persons of skill in the art will appreciate that certain of the twenty-eight standard pins have been omitted or combined for greatest clarity.

Microcontroller IC2 400 is powered through pin 450, which is coupled to a 5 Volt source of DC power 700. Source 700 is preferably driven from supply 300 through a coupling (not shown) that includes a voltage regulator (not shown). An exemplary voltage regulator is the LM340 3-terminal positive regulator, available from the National Semiconductor Corporation, Santa Clara, Calif. The teachings of the LM340 datasheet are hereby incorporated by reference. Those of skill in the art will appreciate that most microcontrollers, and many other independently powered digital integrated circuits, are rated for no more than a 5 Volt power source. The clock frequency of microcontroller IC2 400 is set by crystal 480, coupled through appropriate pins. Pin 490 is the microcontroller IC2 400 ground reference.

Switch 600 is a twelve position dip switch that may be alterably and mechanically set to uniquely identify the microcontroller IC2 400. When individual ones of the twelve mechanical switches within dip switch 600 are closed, a path is generated from corresponding pins 650 on microcontroller IC2 400 to ground 690. Twelve switches create $2^{12}$ possible settings, allowing any microcontroller IC2 400 to take on one of 4096 different IDs, or addresses. In the preferred embodiment, only nine switches are actually used because the DMX-512 protocol, discussed below, is employed.

Figure 2A:
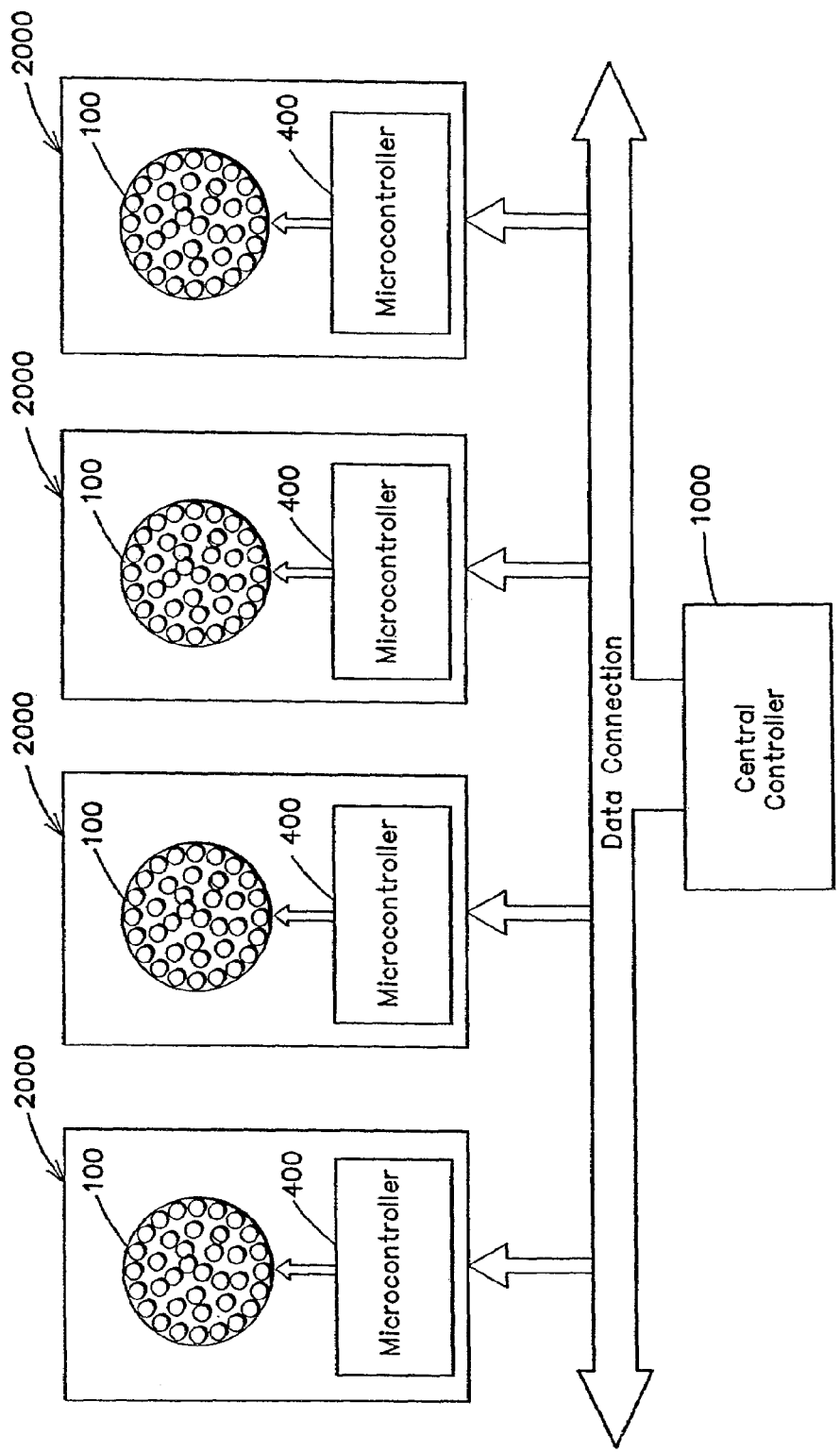
FIG. 2A illustrates a network of addressable LED-based lighting units according to one embodiment of the invention.

Once switch 600 is set, microcontroller IC2 400 "knows" its unique address ("who am I"), and "listens" on serial line 520 for a data stream specifically addressed to it. A high speed network protocol, preferably a DMX protocol, is used to address network data to each individually addressed microcontroller IC2 400 from a central network controller 1000, as shown for example in FIG. 2A. The DMX protocol is described in a United States Theatre Technology, Inc. publication entitled "DMX512/1990 Digital Data Transmission Standard for Dimmers and Controllers," incorporated herein by reference. Basically, in the network protocol used herein, a central controller creates a stream of network data consisting of sequential data packets. Each packet first contains a header, which is checked for conformance to the standard and discarded, followed by a stream of sequential bytes representing data for sequentially addressed devices. For instance, if the data packet is intended for light number fifteen, then fourteen bytes from the data stream will be discarded, and the device will save byte number fifteen. If as in the preferred embodiment, more than one byte is needed, then the address is considered to be a starting address, and more than one byte is saved and utilized. Each byte corresponds to a decimal number 0 to 255, linearly representing the desired intensity from Off to Full. (For simplicity, details of the data packets such as headers and stop bits are omitted from this description, and will be well appreciated by those of skill in the art.) This way, each of the three LED colors is assigned a discrete intensity value between 0 and 255. These respective intensity values are stored in respective registers within the memory of microcontroller IC2 400 (not shown). Once the central controller exhausts all data packets, it starts over in a continuous refresh cycle. The refresh cycle is defined by the standard to be a minimum of 1196 microseconds, and a maximum of 1 second.

Microcontroller IC2 400 is programmed continually to "listen" for its data stream. When microcontroller IC2 400 is "listening," but before it detects a data packet intended for it, it is running a routine designed to create the square wave signal outputs on pins 434, 454 and 474. The values in the color registers determine the duty cycle of the square wave. Since each register can take on a value from 0 to 255, these values create 256 possible different duty cycles in a linear range from 0% to 100%. Since the square wave frequency is uniform and determined by the program running in the microcontroller IC2 400, these different discrete duty cycles represent variations in the width of the square wave pulses. This is known as pulse width modulation (PWM).

The PWM interrupt routine is implemented using a simple counter, incrementing from 0 to 255 in a cycle during each period of the square wave output on pins 434, 454 and 474. When the counter rolls over to zero, all three signals are set high. Once the counter equals the register value, signal output is changed to low. When microcontroller IC2 400 receives new data, it freezes the counter, copies the new data to the working registers, compares the new register values with the current count and updates the output pins accordingly, and then restarts the counter exactly where it left off. Thus, intensity values may be updated in the middle of the PWM cycle. Freezing the counter and simultaneously updating the signal outputs has at least two advantages. First, it allows each lighting unit to quickly pulse/strobe as a strobe light does. Such strobing happens when the central controller sends network data having high intensity values alternately with network data having zero intensity values at a rapid rate. If one restarted the counter without first updating the signal outputs, then the human eye would be able to perceive the staggered deactivation of each individual color LED that is set at a different pulse width. This feature is not of concern in incandescent lights because of the integrating effect associated with the heating and cooling cycle of the illumination element. LEDs, unlike incandescent elements, activate and deactivate essentially instantaneously in the present application. The second advantage is that one can "dim" the LEDs without the flickering that would otherwise occur if the counter were reset to zero. The central controller can send a continuous dimming signal when it creates a sequence of intensity values representing a uniform and proportional decrease in light intensity for each color LED. If one did not update the output signals before restarting the counter, there is a possibility that a single color LED will go through nearly two cycles without experiencing the zero current state of its duty cycle. For instance, assume the red register is set at 4 and the counter is set at 3 when it is frozen. Here, the counter is frozen just before the "off" part of the PWM cycle is to occur for the red LEDs. Now assume that the network data changes the value in the red register from 4 to 2 and the counter is restarted without deactivating the output signal. Even though the counter is greater than the intensity value in the red register, the output state is still "on", meaning that maximum current is still flowing through the red LEDs. Meanwhile, the blue and green LEDs will probably turn off at their appropriate times in the PWM cycle. This would be perceived by the human eye as a red flicker in the course of dimming the color intensities. Freezing the counter and updating the output for the rest of the PWM cycle overcomes these disadvantages, ensuring the flicker does not occur.

Figures 1, 2B:
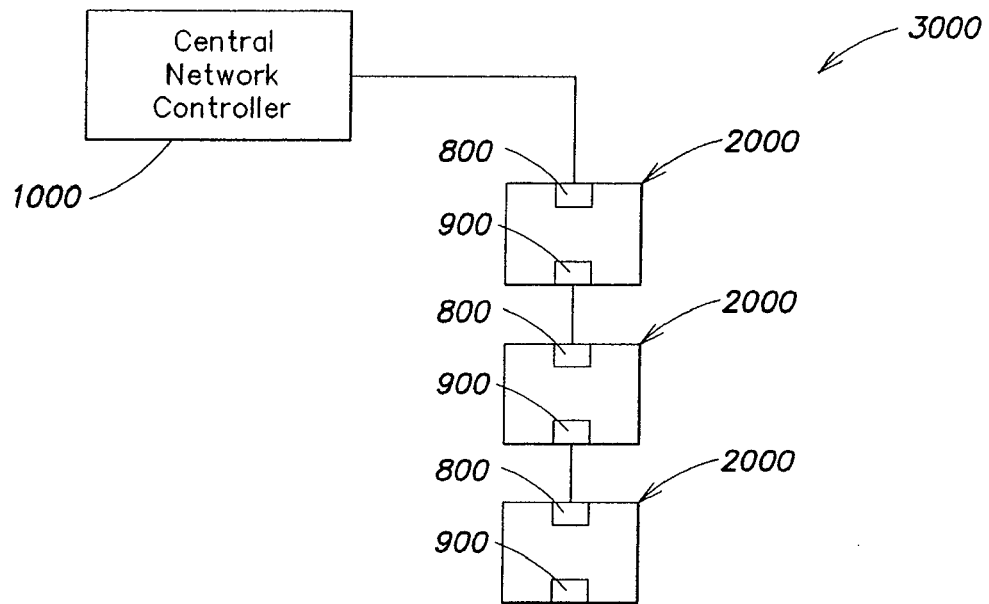
Figures 2, 2B:
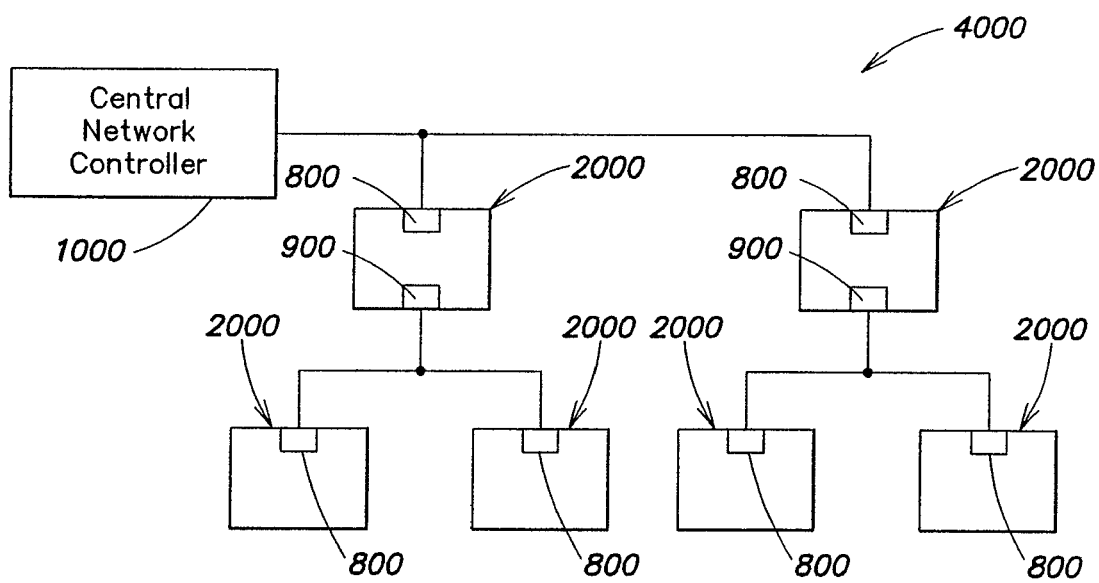

The network interface for microcontroller IC2 400 will now be described. Jacks 800 and 900 are standard RJ-8 network jacks. Jack 800 is used as an input jack, and is shown for simplicity as having only three inputs: signal inputs 860, 870 and ground 850. Network data enters jack 800 and passes through signal inputs 860 and 870. These signal inputs are then coupled to IC3 500, which is an RS-485/RS-422 differential bus repeater of the standard type, preferably a DS96177 from the National Semiconductor Corporation, Santa Clara, Calif. The teachings of the DS96177 datasheet are hereby incorporated by reference. The signal inputs 860, 870 enter IC3 500 at pins 560, 570. The data signal is passed through from pin 510 to pin 520 on microcontroller IC2 400. The same data signal is then returned from pin 540 on IC2 400 to pin 530 on IC3 500. Jack 900 is used as an output jack and is shown for simplicity as having only five outputs: signal outputs 960, 970, 980, 990 and ground 950. Outputs 960 and 970 are split directly from input lines 860 and 870, respectively. Outputs 980 and 990 come directly from IC3 500 pins 580 and 590, respectively. It will be appreciated that the foregoing assembly enables two network nodes to be connected for receiving the network data. Thus, a network may be constructed as a daisy chain 3000 (or linear chain of nodes), if only single nodes 2000 are strung together, as shown in FIG. 2B-1, or as a binary tree 4000, if two nodes are attached to the output of each single node as shown in FIG. 2B-2.

From the foregoing description, one can see that an addressable network of LED illumination or display units 2000 as shown in FIG. 2A and FIGS. 2B-1 and 2B-2 can be constructed from a collection of power modules each connected to a respective light module. As long as at least two primary color LEDs are used, any illumination or display color may be generated simply by preselecting the light intensity that each color emits. Further, each color LED can emit light at any of 255 different intensities, depending on the duty cycle of PWM square wave, with a full intensity pulse generated by passing maximum current through the LED. Further still, the maximum intensity can be conveniently programmed simply by adjusting the ceiling for the maximum allowable current using programming resistances for the current regulators residing on the light module. Light modules of different maximum current ratings may thereby be conveniently interchanged.

Figure 3:
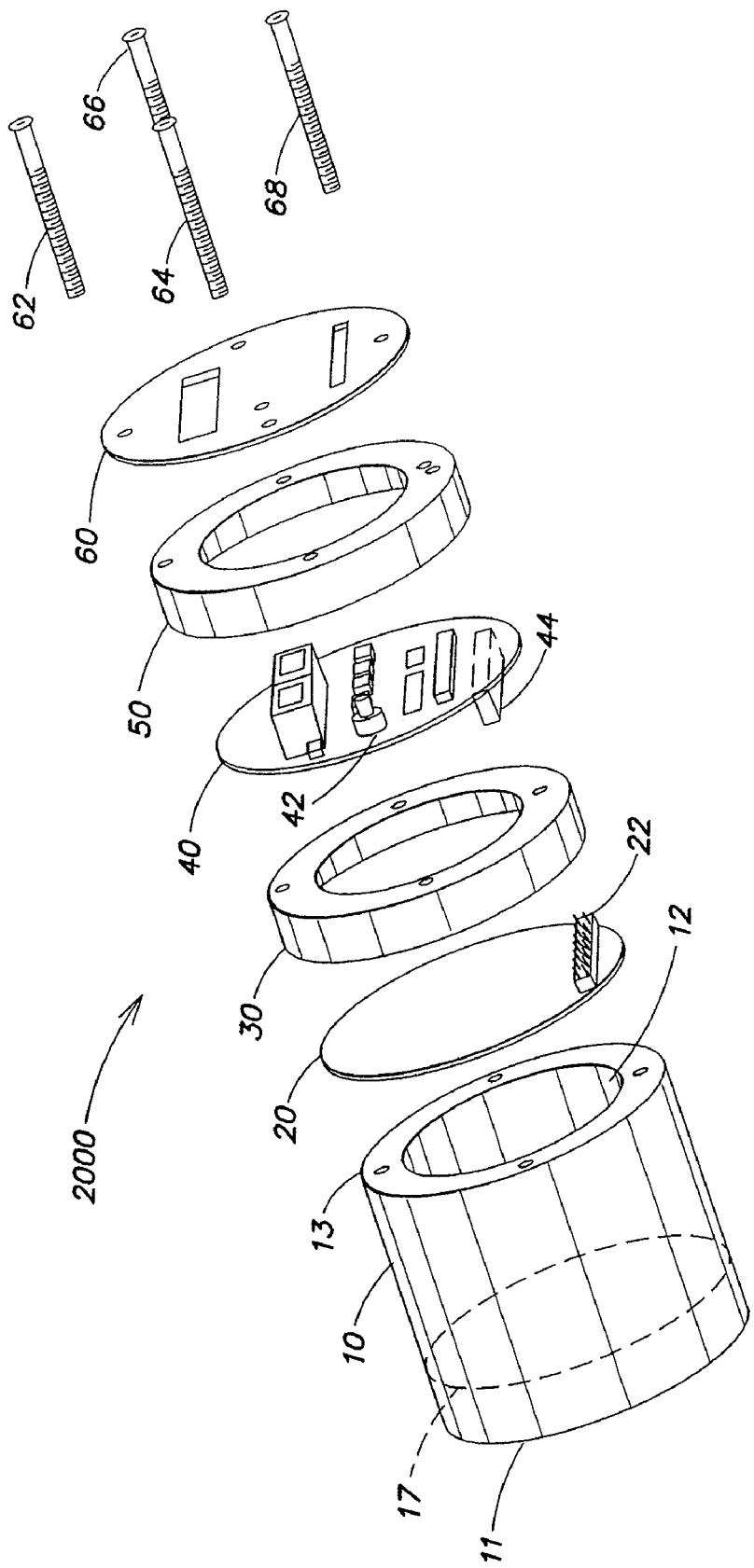
FIG. 3 is an exploded view of the housing of one of the embodiments of the present invention.

The foregoing embodiment may reside in any number of different housings. A preferred housing for an illumination unit is described. Turning now to FIG. 3, there is shown an exploded view of an illumination unit 2000 of the present invention comprising a substantially cylindrical body section 10, a light module 20, a conductive sleeve 30, a power module 40, a second conductive sleeve 50 and an enclosure plate 60. It is to be assumed here that the light module 20 and the power module 40 contain the electrical structure and software of light module 100 and power module 200, described above. Screws 62, 64, 66, 68 allow the entire apparatus to be mechanically connected. Body section 10, conductive sleeves 30 and 50 and enclosure plate 60 are preferably made from a material that conducts heat, most preferably aluminum. Body section 10 has an open end 10, a reflective interior portion 12 and an illumination end 13, to which module 20 is mechanically affixed. Light module 20 is disk shaped and has two sides. The illumination side (not shown) comprises a plurality of LEDs of different primary colors. The connection side holds an electrical connector male pin assembly 22. Both the illumination side and the connection side are coated with aluminum surfaces to better allow the conduction of heat outward from the plurality of LEDs to the body section 10. Likewise, power module 40 is disk shaped and has every available surface covered with aluminum for the same reason. Power module 40 has a connection side holding an electrical connector female pin assembly 44 adapted to fit the pins from assembly 22. Power module 40 has a power terminal side holding a terminal 42 for connection to a source of DC power. Any standard AC or DC jack may be used, as appropriate.

Interposed between light module 20 and power module 40 is a conductive aluminum sleeve 30, which substantially encloses the space between modules 20 and 40. As shown, a disk-shaped enclosure plate 60 and screws 62, 64, 66 and 68 sad all of the components together, and conductive sleeve 50 is thus interposed between enclosure plate 60 and power module 40. Once sealed together as a unit, the illumination apparatus may be connected to a data network as described above and mounted in any convenient manner to illuminate an area. In operation, preferably a light diffusing means 17 will be inserted in body section 10 to ensure that the LEDs on light module 20 appear to emit a single uniform frequency of light.

Figure 8:
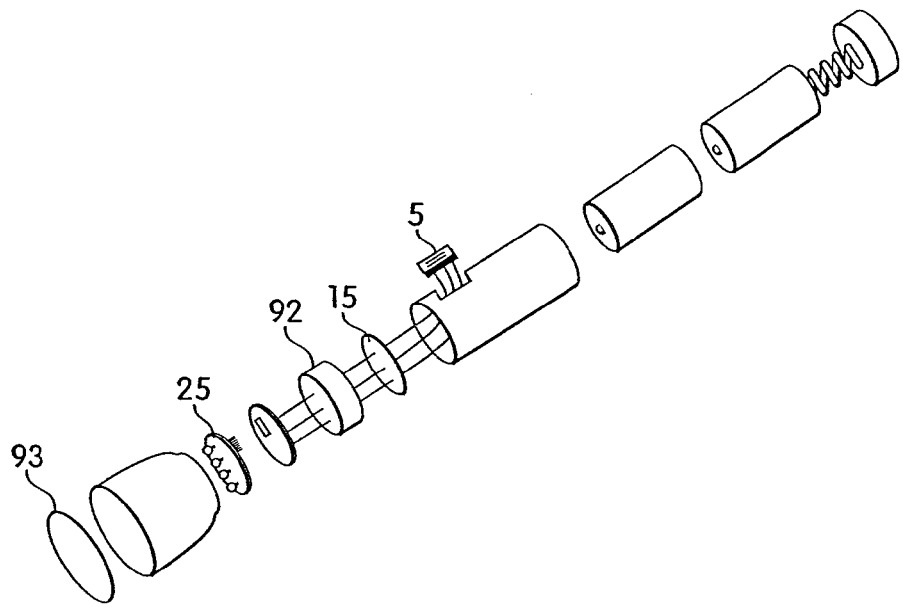
FIG. 8 is an exploded view of a flashlight assembly containing the LED lighting module of the present invention.

From the foregoing, it will be appreciated that PWM current control of LEDs to produce multiple colors may be incorporated into countless environments, with or without networks. For instance, FIG. 8 shows a hand-held flashlight can be made to shine any conceivable color using an LED assembly of the present invention. The flashlight contains an external adjustment means 5, that may be for instance a set of three potentiometers coupled to an appropriately programmed microcontroller 92 through respective A/D conversion means 15. Each potentiometer would control the current duty cycle, and thus the illumination intensity, of an individual color LED on LED board 25. With three settings each capable of generating a different byte from 0 to 255, a computer-controlled flashlight may generate twenty-four bit color. Of course, three individual potentiometers can be incorporated into a single device, such as a track ball or joystick, so as to be operable as a single adjuster. Further, it is not necessary that the adjustment means must be a potentiometer. For instance, a capacitive or resistive thumb plate may also be used to program the two or three registers necessary to set the color. A lens assembly 93 may be provided for reflecting the emitted light. A non-hand held embodiment of the present invention may be used as an underwater swimming pool light. Since the present invention can operate at relatively low voltages and low current, it is uniquely suited for safe underwater operation.

Figure 9:
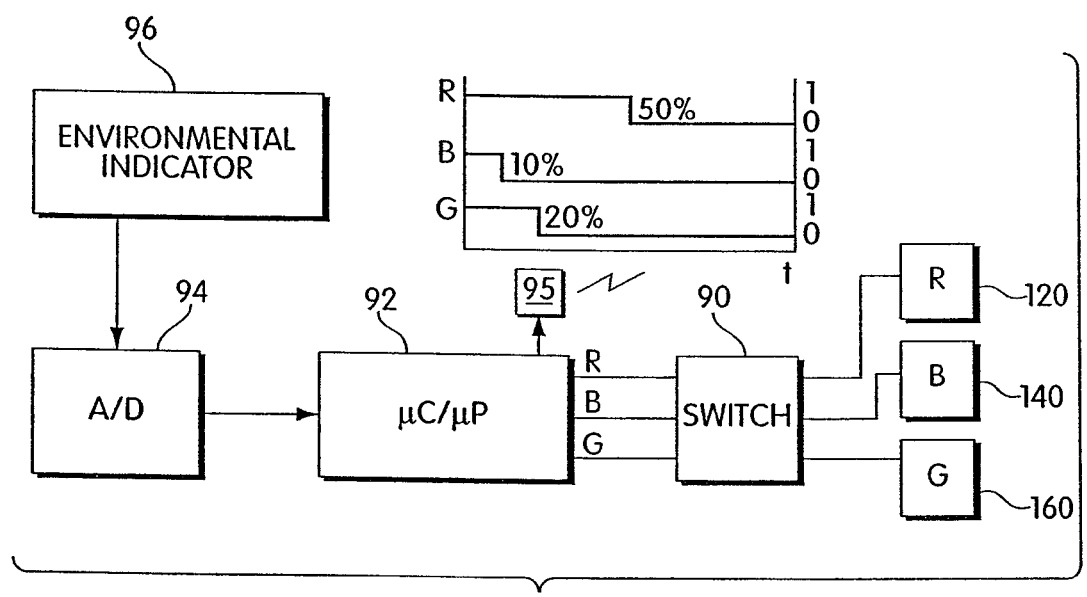
FIG. 9 is a control block diagram of the environmental indicator of the present invention.

Similarly, the present invention may be used as a general indicator of any given environmental condition. FIG. 9 shows the general functional block diagram for such an apparatus. Shown within FIG. 9 is also an exemplary chart showing the duty cycles of the three color LEDs during an exemplary period. As one example of an environmental indicator 96, the power module can be coupled to an inclinometer. The inclinometer measures general angular orientation with respect to the earth's center of gravity. The inclinometer's angle signal can be converted through an A/D converter 94 and coupled to the data inputs of the microcontroller 92 in the power module. The microcontroller 92 can then be programmed to assign each discrete angular orientation a different color through the use of a lookup table associating angles with LED color register values. A current switch 90, coupled to the microcontroller 92, may be used to control the current supply to LEDs 120, 140, and 160 of different colors. The microcontroller 92 may be coupled to a transceiver 95 for transmitting and receiving signals. The "color inclinometer" may be used for safety, such as in airplane cockpits, or for novelty, such as to illuminate the sails on a sailboat that sways in the water. Another indicator use is to provide an easily readable visual temperature indication. For example, a digital thermometer can be connected to provide the microcontroller a temperature reading. Each temperature will be associated with a particular set of register values, and hence a particular color output. A plurality of such "color thermometers" can be located over a large space, such as a storage freezer, to allow simple visual inspection of temperature over three dimensions.

Figure 10:
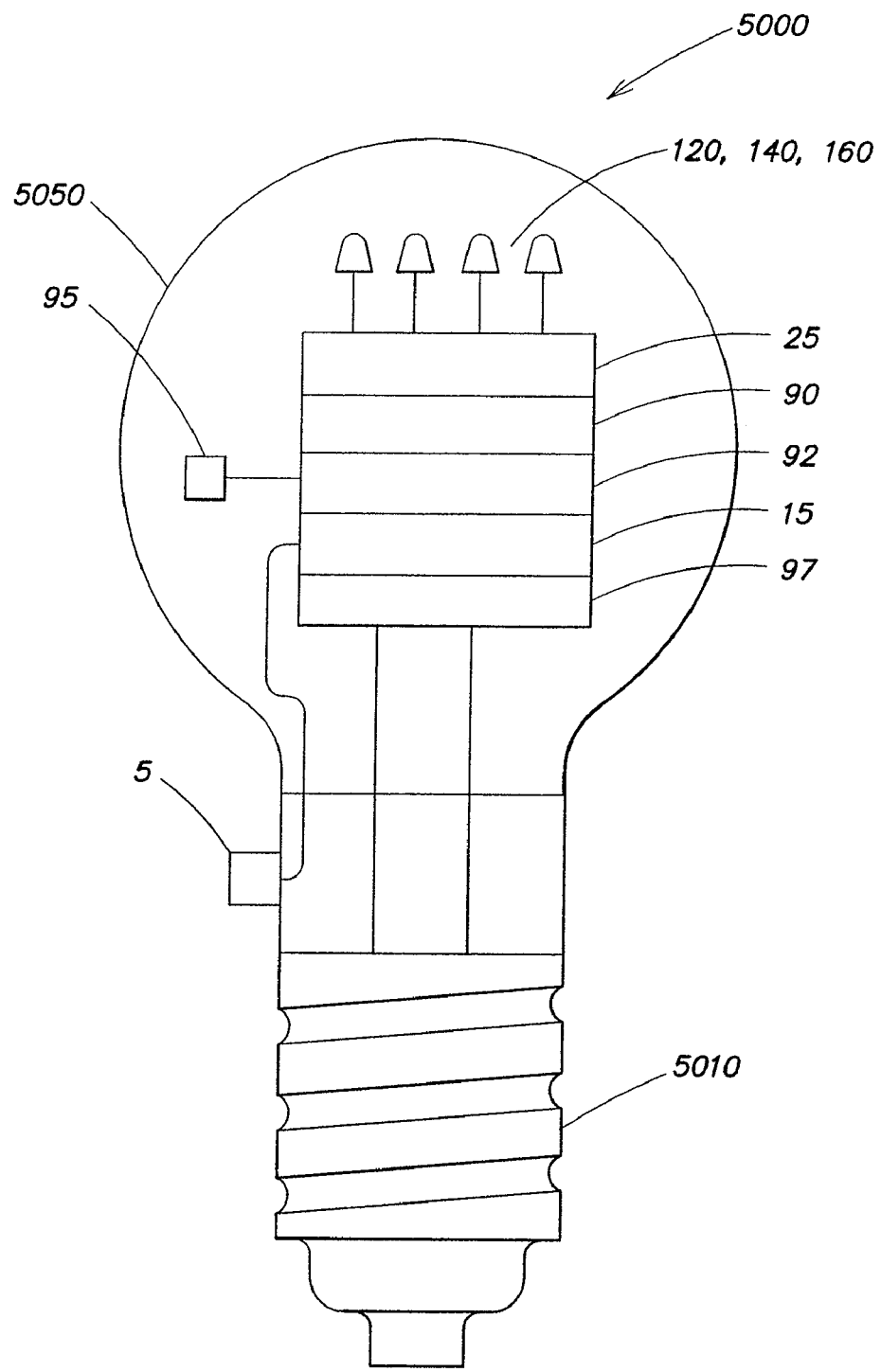
FIG. 10 illustrates an LED-based light bulb according to one embodiment of the present invention.

Another use of the present invention is as a light bulb 5000, as shown for example in FIG. 10. Using appropriate rectifier and voltage transformation means 97, the entire power and light modules may be placed in an Edison-mount (screw-type 5010) light bulb housing. Each bulb can be programmed with particular register values to deliver a particular color bulb, including white. The current regulator can be pre-programmed to give a desired current rating and thus preset light intensity. Naturally, the light bulb will have a transparent or translucent section 5050 that allows the passage of light into the ambient.

While the foregoing has been a detailed description of the preferred embodiment of the invention, the claims which follow define more freely the scope of invention to which applicant is entitled. Modifications or improvements which may not come within the explicit language of the claims described in the preferred embodiments should be treated as within the scope of invention insofar as they are equivalent or otherwise consistent with the contribution over the prior art and such contribution is not to be limited to specific embodiments disclosed.

The invention claimed is:

1. An illumination apparatus, comprising:
 a first number of first LED light sources adapted to generate first radiation having a first spectrum;
 a second number of second LED light sources adapted to generate second radiation having a second spectrum different than the first spectrum, wherein the first number and the second number are different;
 at least one controller coupled to the first number of first light sources and the second number of second light sources and configured to control at least a first intensity of the first radiation and a second intensity of the second radiation such that an overall perceivable color of visible radiation generated by the apparatus is white;
 at least one power connection coupled to the at least one controller, the at least one power connection configured to engage mechanically and electrically with a conventional light socket; and
 at least one of a housing and a mounting for the first and second light sources and the at least one controller, wherein the at least one of the housing and the mounting is configured to resemble at least one type of conventional light bulb,
 wherein the at least one controller is configured to independently control at least the first intensity of the first radiation and the second intensity of the second radiation so as to controllably vary the overall perceivable color of the visible radiation generated by the illumination apparatus, and wherein the apparatus further comprises:
 at least one user interface coupled to the at least one controller and configured to facilitate an adjustment of the overall perceivable color of the visible radiation generated by the illumination apparatus.

2. An illumination apparatus, comprising:
 a first number of first LED light sources adapted to generate first radiation having a first spectrum;
 a second number of second LED light sources adapted to generate second radiation having a second spectrum different than the first spectrum, wherein the first number and the second number are different;
 at least one controller coupled to the first number of first light sources and the second number of second light sources and configured to control at least a first intensity of the first radiation and a second intensity of the second radiation such that an overall perceivable color of visible radiation generated by the apparatus is white;
 at least one power connection coupled to the at least one controller, the at least one power connection configured to engage mechanically and electrically with a conventional light socket; and
 at least one of a housing and a mounting for the first and second light sources and the at least one controller, wherein the at least one of the housing and the mounting is configured to resemble at least one type of conventional light bulb,
 wherein the at least one controller is configured to independently control at least the first intensity of the first radiation and the second intensity of the second radiation so as to controllably vary the overall perceivable color of the visible radiation generated by the illumination apparatus, and wherein the apparatus further comprises:
 at least one sensor coupled to the at least one controller and configured to generate at least one control signal in response to at least one detectable condition, wherein the at least one controller is configured to control the overall perceivable color of the visible radiation generated by the illumination apparatus in response to the at least one control signal.

3. An illumination apparatus, comprising:
 a first number of first LED light sources adapted to generate first radiation having a first spectrum;
 a second number of second LED light sources adapted to generate second radiation having a second spectrum different than the first spectrum, wherein the first number and the second number are different;

at least one controller coupled to the first number of first light sources and the second number of second light sources and configured to control at least a first intensity of the first radiation and a second intensity of the second radiation such that an overall perceivable color of visible radiation generated by the apparatus is white;

at least one power connection coupled to the at least one controller, the at least one power connection configured to engage mechanically and electrically with a conventional light socket; and at least one of a housing and a mounting for the first and second light sources and the at least one controller, wherein the at least one of the housing and the mounting is configured to resemble at least one type of conventional light bulb, wherein the at least one controller is configured to independently control at least the first intensity of the first radiation and the second intensity of the second radiation so as to controllably vary the overall perceivable color of the visible radiation generated by the illumination apparatus, and wherein the apparatus further comprises:

at least one of a receiver and a transmitter coupled to the at least one controller and configured to communicate at least one control signal to or from the illumination apparatus.

4. An illumination apparatus, comprising:

a first number of first LED light sources adapted to generate first radiation having a first spectrum;

a second number of second LED light sources adapted to generate second radiation having a second spectrum different than the first spectrum, wherein the first number and the second number are different;

at least one controller coupled to the first number of first light sources and the second number of second light sources and configured to control at least a first intensity of the first radiation and a second intensity of the second radiation such that an overall perceivable color of visible radiation generated by the apparatus is white;

at least one power connection coupled to the at least one controller, the at least one power connection configured to engage mechanically and electrically with a conventional light socket; and at least one of a housing and a mounting for the first and second light sources and the at least one controller, wherein the at least one of the housing and the mounting is configured to resemble at least one type of conventional light bulb, wherein the at least one controller is configured to independently control at least the first intensity of the first radiation and the second intensity of the second radiation using a pulse width modulation (PWM) technique so as to controllably vary the overall perceivable color of the visible radiation generated by the illumination apparatus.

5. An illumination method, comprising acts of:

A) generating first radiation having a first spectrum from a first number of first LED light sources;

B) generating second radiation having a second spectrum different than the first spectrum from a second number of second LED light sources, wherein the first number and the second number are different;

C) mixing at least a portion of the first radiation and a portion of the second radiation to provide visible radiation having an overall perceivable color; and D) controlling at least a first intensity of the first radiation and a second intensity of the second radiation such that the overall perceivable color of the visible radiation is white, wherein the act D) includes an act of independently controlling at least the first intensity of the first radiation and the second intensity of the second radiation so as to controllably vary the overall perceivable color of the visible radiation, and wherein the method further includes an act of:

adjusting the overall perceivable color of the visible radiation via at least one user interface.

6. An illumination apparatus, comprising:

a plurality of first LED light sources adapted to generate first radiation having a first spectrum;

a plurality of second LED light sources adapted to generate second radiation having a second spectrum different than the first spectrum;

at least one controller coupled to the plurality of first light sources and the plurality of second light sources and configured to independently control at least a first intensity of the first radiation and a second intensity of the second radiation so as to controllably vary at least an overall perceivable color of visible radiation generated by the illumination apparatus, wherein:

the at least one controller is configured to generate a first control signal to control all of the first light sources substantially identically and a second control signal to control all of the second light sources substantially identically; and the at least one controller is configured to control at least the first intensity of the first radiation and the second intensity of the second radiation such that the overall perceivable color of the visible radiation is white;

at least one power connection coupled to the at least one controller, the at least one power connection configured to engage mechanically and electrically with a conventional light socket; and at least one user interface coupled to the at least one controller and configured to facilitate an adjustment of the overall perceivable color of the visible radiation generated by the illumination apparatus.

7. An illumination apparatus, comprising:

a plurality of first LED light sources adapted to generate first radiation having a first spectrum;

a plurality of second LED light sources adapted to generate second radiation having a second spectrum different than the first spectrum;

at least one controller coupled to the plurality of first light sources and the plurality of second light sources and configured to independently control at least a first intensity of the first radiation and a second intensity of the second radiation so as to controllably vary at least an overall perceivable color of visible radiation generated by the illumination apparatus, wherein:

the at least one controller is configured to generate a first control signal to control all of the first light sources substantially identically and a second control signal to control all of the second light sources substantially identically; and the at least one controller is configured to control at least the first intensity of the first radiation and the second intensity of the second radiation such that the overall perceivable color of the visible radiation is white;

at least one power connection coupled to the at least one controller, the at least one power connection configured to engage mechanically and electrically with a conventional light socket; and at least one sensor coupled to the at least one controller and configured to generate at least one control signal in response to at least one detectable condition, wherein the at least one controller is configured to control the overall perceivable color of the visible radiation generated by the illumination apparatus in response to the at least one control signal.

8. An illumination apparatus, comprising:

a plurality of first LED light sources adapted to generate first radiation having a first spectrum;

a plurality of second LED light sources adapted to generate second radiation having a second spectrum different than the first spectrum;

at least one controller coupled to the plurality of first light sources and the plurality of second light sources and configured to independently control at least a first intensity of the first radiation and a second intensity of the second radiation so as to controllably vary at least an overall perceivable color of visible radiation generated by the illumination apparatus, wherein:

the at least one controller is configured to generate a first control signal to control all of the first light sources substantially identically and a second control signal to control all of the second light sources substantially identically; and the at least one controller is configured to control at least the first intensity of the first radiation and the second intensity of the second radiation such that the overall perceivable color of the visible radiation is white;

at least one power connection coupled to the at least one controller, the at least one power connection configured to engage mechanically and electrically with a conventional light socket; and at least one of a receiver and a transmitter coupled to the at least one controller and configured to communicate at least one control signal to or from the illumination apparatus.

9. An illumination apparatus, comprising:

a plurality of first LED light sources adapted to generate first radiation having a first spectrum;

a plurality of second LED light sources adapted to generate second radiation having a second spectrum different than the first spectrum;

at least one controller coupled to the plurality of first light sources and the plurality of second light sources and configured to control at least a first intensity of the first radiation and a second intensity of the second radiation using a pulse width modulation (PWM) technique, wherein:

the at least one controller is configured to generate a first control signal to control all of the first light sources substantially identically and a second control signal to control all of the second light sources substantially identically; and the at least one controller is configured to control at least the first intensity of the first radiation and the second intensity of the second radiation such that the overall perceivable color of the visible radiation is white; and at least one power connection coupled to the at least one controller, the at least one power connection configured to engage mechanically and electrically with a conventional light socket.

10. An illumination method, comprising acts of:

A) generating first radiation having a first spectrum from a plurality of first LED light sources;

B) generating second radiation having a second spectrum different than the first spectrum from a plurality of second LED light sources;

C) mixing at least a portion of the first radiation and a portion of the second radiation to provide an overall perceivable color of the visible radiation;

D) independently controlling at least a first intensity of the first radiation and a second intensity of the second radiation so as to controllably vary at least the overall perceivable color of the visible radiation, wherein the act D) includes acts of:

controlling all of the first light sources substantially identically;

controlling all of the second light sources substantially identically; and controlling at least the first intensity of the first radiation and the second intensity of the second radiation such that the overall perceivable color of the visible radiation is white; and E) adjusting the overall perceivable color of the visible radiation via at least one user interface to include white and other colors.

* * * * *